May 21, 1940. R. M. PHINNEY ET AL 2,201,973
INTERLOCKING SYSTEM FOR RAILROADS
Filed Jan. 4, 1938 8 Sheets-Sheet 3

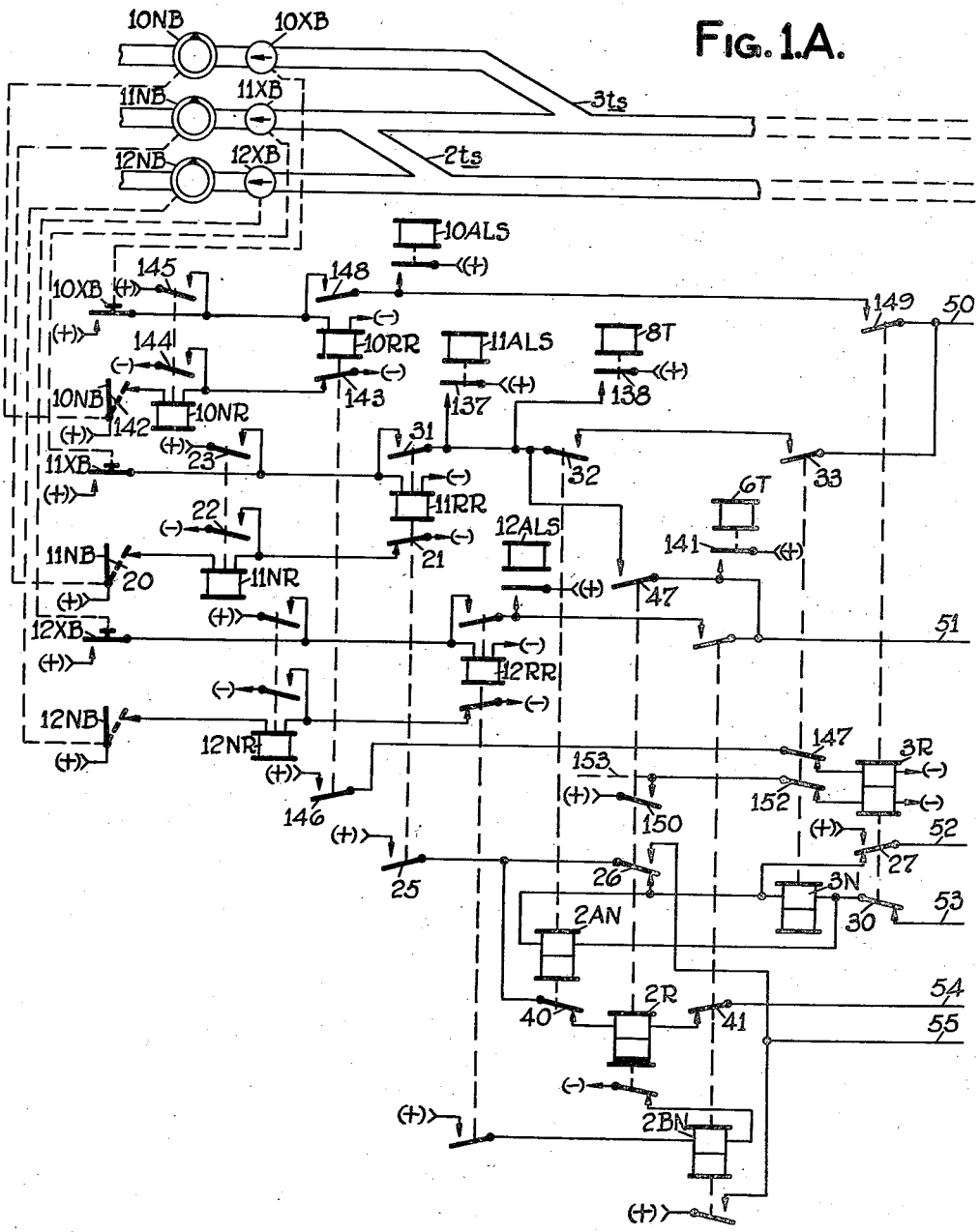

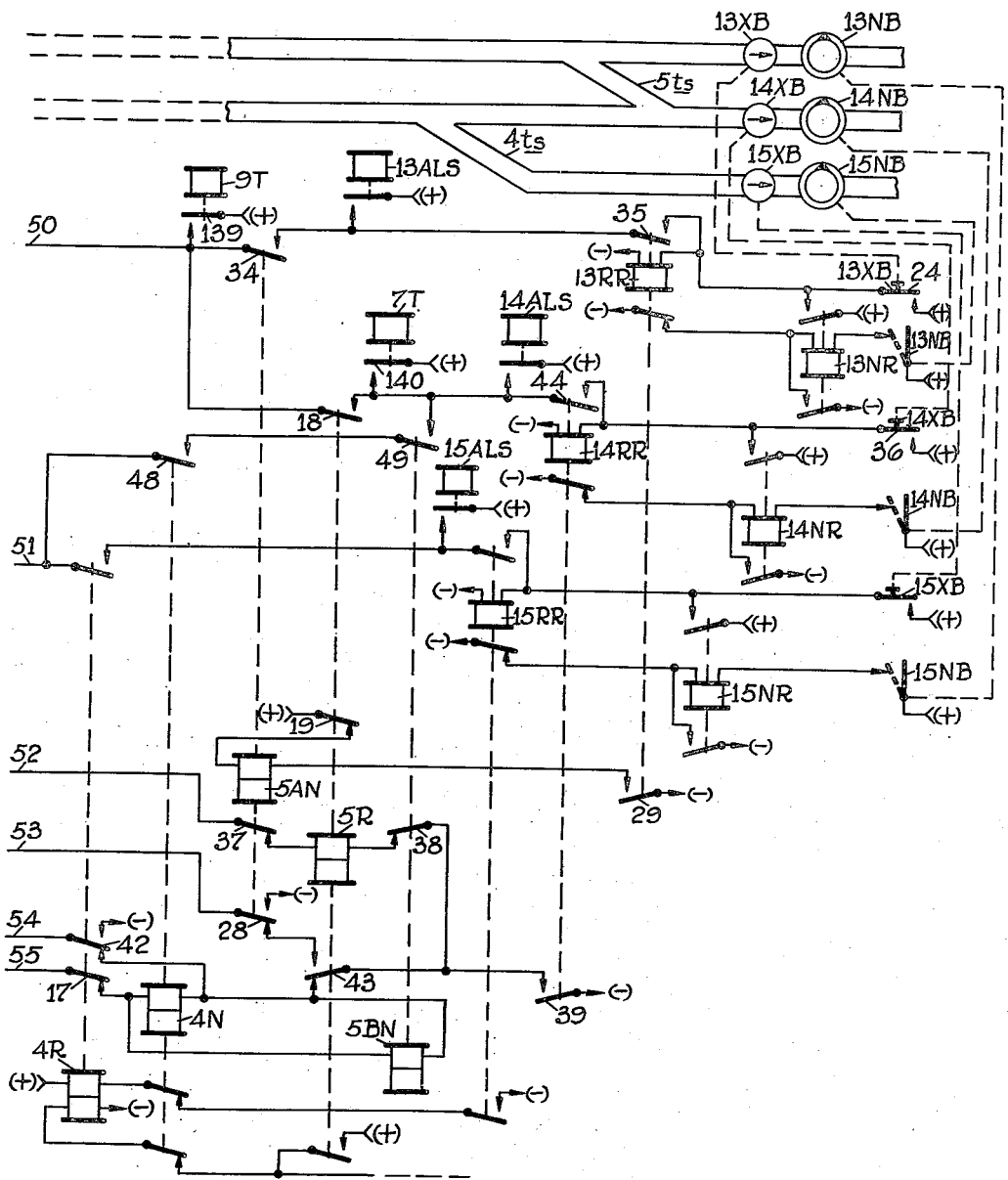

INVENTORS
R.M.Phinney and F.B.Hitchcock
BY Neil W. Preston
THEIR ATTORNEY

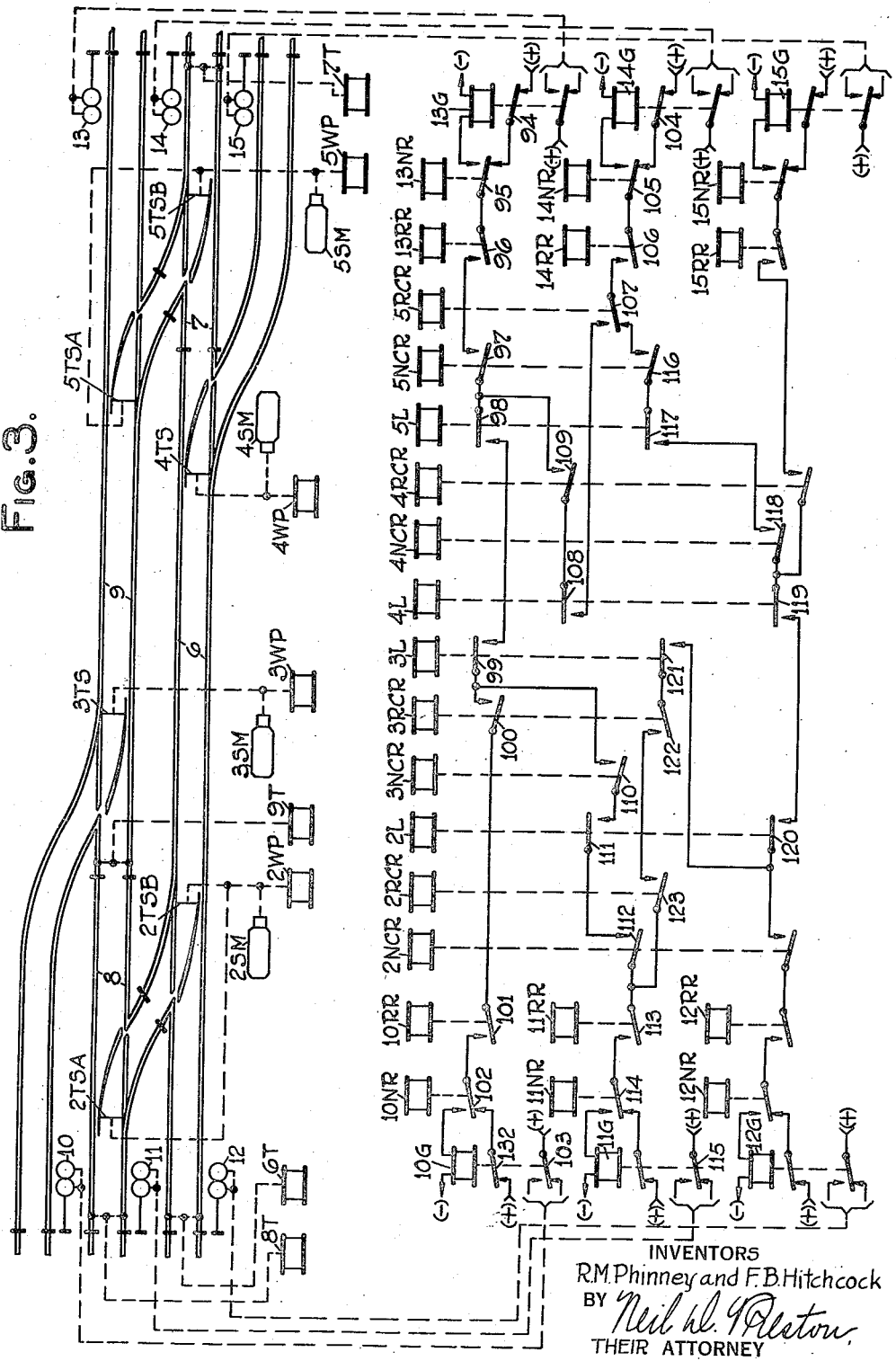

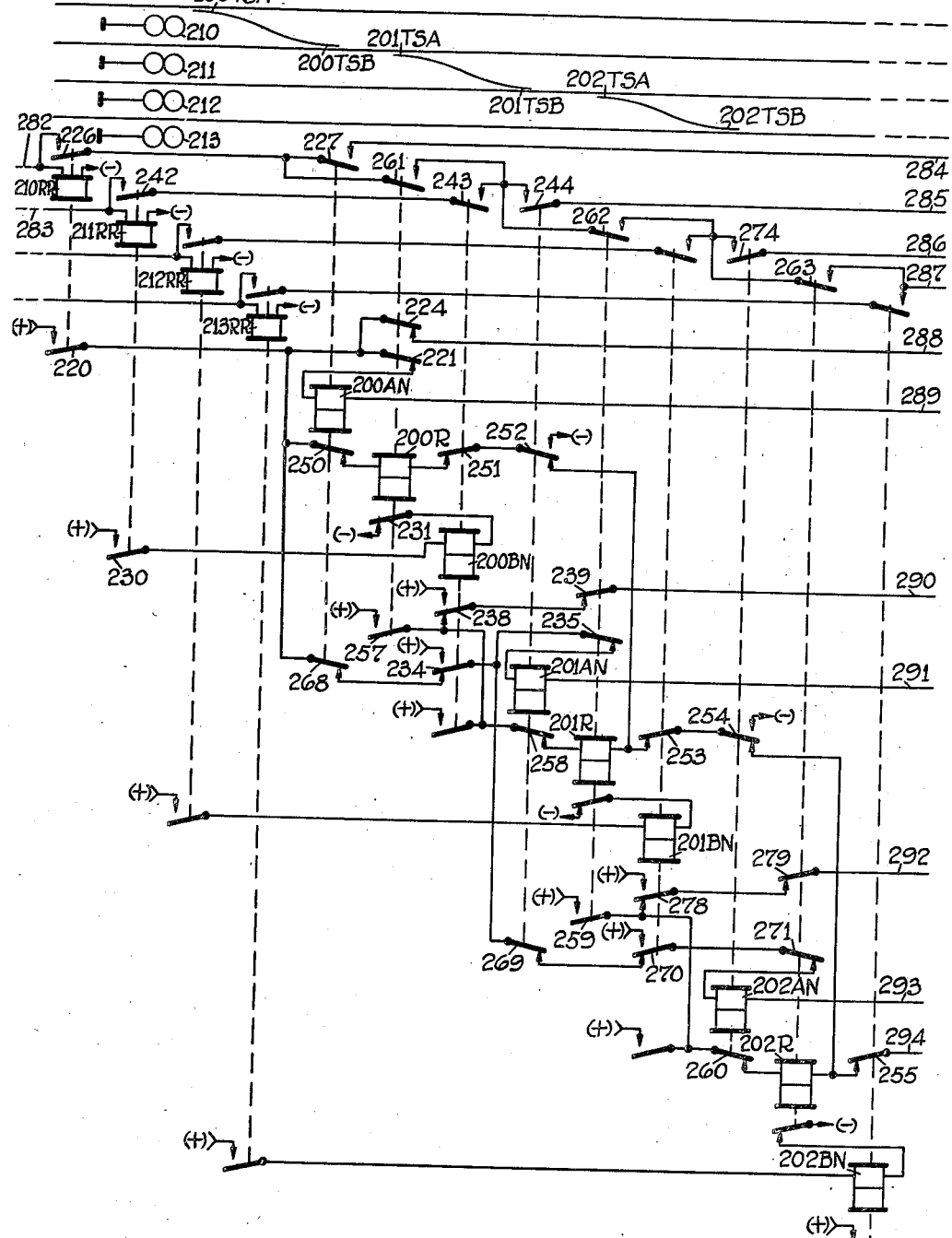

May 21, 1940.　　　　R. M. PHINNEY ET AL　　　　2,201,973
INTERLOCKING SYSTEM FOR RAILROADS
Filed Jan. 4, 1938　　　8 Sheets-Sheet 6
FIG. 4.B.
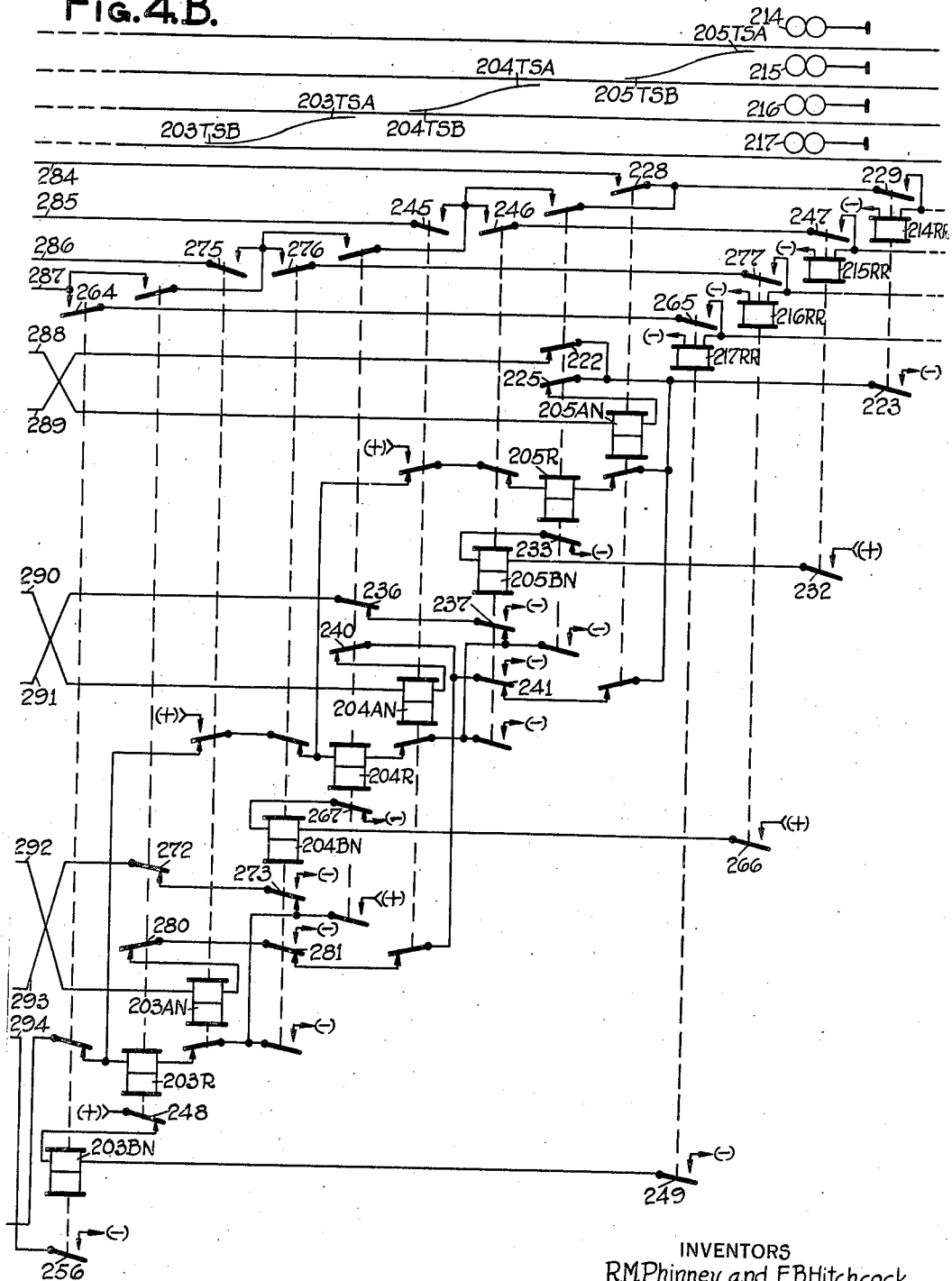
INVENTORS
R.M.Phinney and F.B.Hitchcock
BY Neil W. Preston
THEIR ATTORNEY

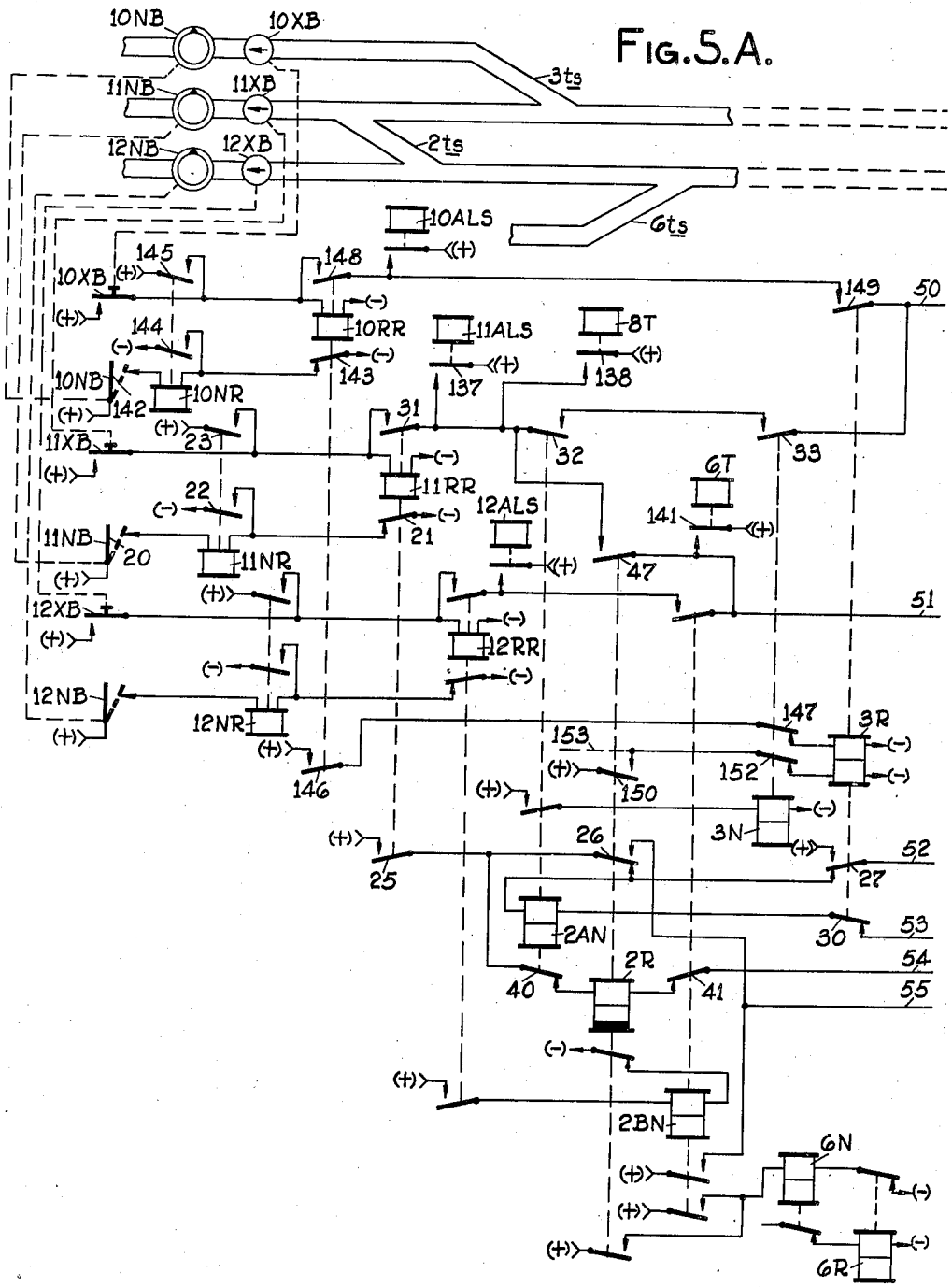
FIG. 5.A.

May 21, 1940.　　　R. M. PHINNEY ET AL　　　2,201,973
INTERLOCKING SYSTEM FOR RAILROADS
Filed Jan. 4, 1938　　　8 Sheets-Sheet 8
FIG. 5.B.
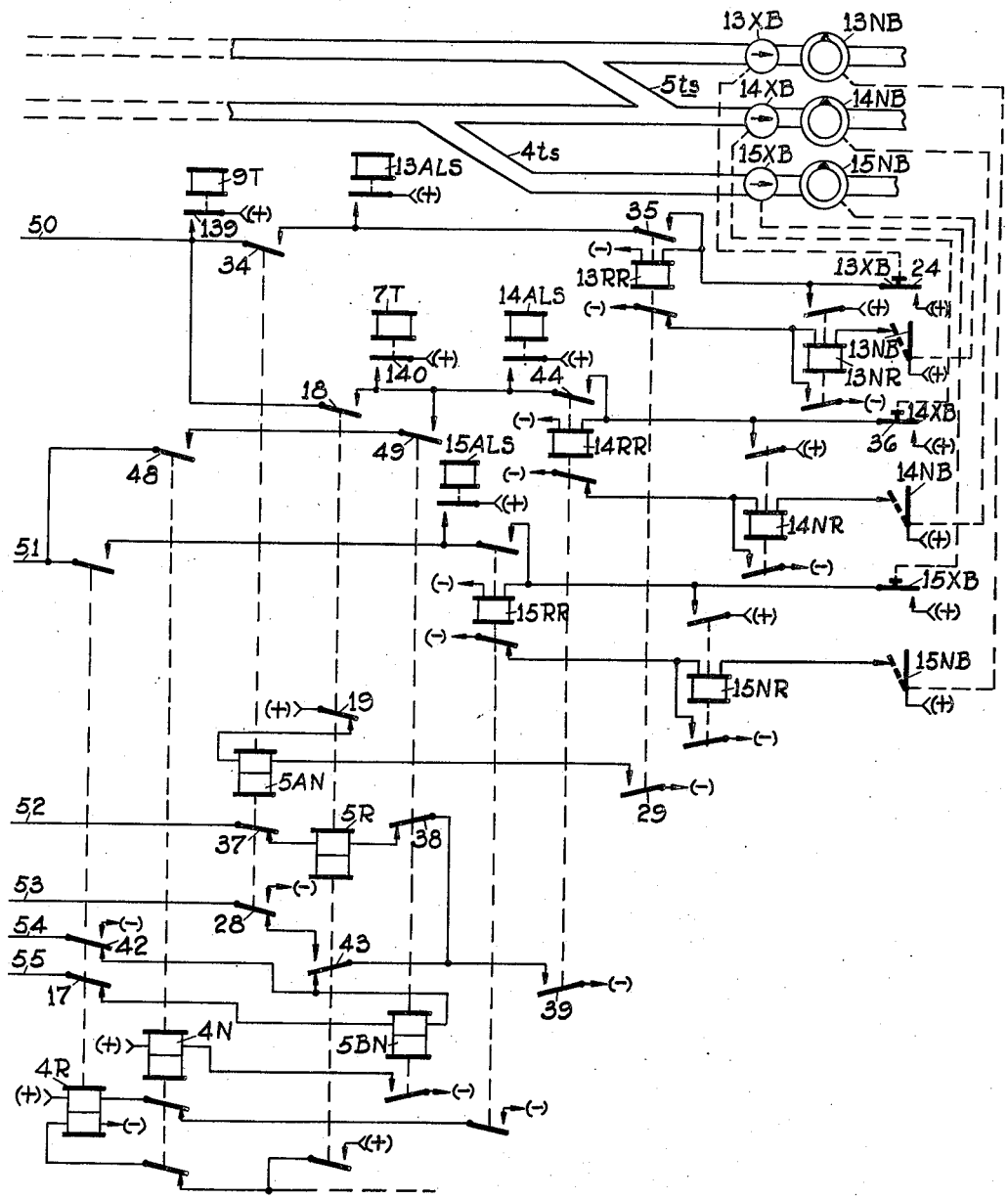
INVENTORS
R.M.Phinney and F.B.Hitchcock
BY Neil W. Preston
THEIR ATTORNEY Patented May 21, 1940

2,201,973

UNITED STATES PATENT OFFICE

2,201,973

INTERLOCKING SYSTEM FOR RAILROADS

Robert M. Phinney, Rochester, and Forest B. Hitchcock, Greece, N. Y., assignors to General Railway Signal Company, Rochester, N. Y.

Application January 4, 1938, Serial No. 183,272

25 Claims. (Cl. 246—134)

This invention relates to interlocking systems for railroads, and more particularly pertains to interlocking systems of the entrance-exit type employing self-selecting networks.

In controlling an interlocking plant, it is desirable to provide a control panel in a control office upon which manually operable devices are located for controlling the setting up of routes through the plant; and in accordance with the present invention the setting up of each of said routes is dependent upon the manual operation of a control button for the entrance end of such route and a control button for the exit end of that route. The operator can readily associate the control buttons with the respective entrance and exit points in the track layout, as a miniature track diagram is provided on the control panel with the control buttons for the various entrance and exit points of the actual track layout located on said track diagram at corresponding points.

The track switches included between any two entrance and exit points respond to the operation of the control buttons for such points through the medium of a self-selecting network of relays as provided by this invention. Only three relays are employed for each crossover and two relays for each single track switch, for selecting and causing the operation of all of the track switches included between the entrance and exit ends of each route; and, furthermore, each of the relays used may be of a standard type, having windings of a given resistance, due to the fact that each relay is energized with full voltage from the power supply, regardless of the route for which it is used.

An important feature of such a self-selecting network of relays is that the number of relays required is independent of the number of different routes which may be set up; and that the addition of track switches to an interlocking plant already installed requires the addition of a number of relays directly proportional to the number of switches added.

Another object of the present invention is to control the relays of said self-selecting network in such a manner that the same circuits used in setting up routes for one direction of traffic may be used for setting up routes for traffic in the opposite direction, thus simplifying the control circuits for the relays so as to minimize the possibilities of failure as well as to facilitate the maintenance of the system.

A further object of this invention is to provide a system which is not dependent upon the sequence of the operation of the control buttons; for example, a route may as well be set up by operating both the entrance and exit buttons for that route at the same time, as by operating the entrance button prior to the operation of the exit button. This feature of the invention saves time in setting up routes, as the operator can usually use both hands in the manipulation of the control buttons for setting up the routes.

The organization of the circuits for the self-selecting network is such that relays used for controlling track switches located at the extreme ends of a particular route are picked up first, and their response causes the energization of relays for other track switches in the route, thus working in toward the center from both ends of such route, until that route which has been designated by the operation of the entrance and exit control buttons has been completely set up.

This invention also provides a system of route locking embodied in the self-selecting network in such a manner that the track relays for track sections included within the limits of the routes are used for rendering the route locking effective; thus eliminating the necessity of providing special route locking relays for each of the track sections between the entrance and exit ends of the routes.

Other objects, purposes and characteristic features of the present invention will be in part obvious from the accompanying drawings, and in part pointed out as the description of the invention progresses.

In describing the invention in detail, reference will be made to the accompanying drawings, in which like reference characters provided with distinctive preceding numerals, distinguish corresponding parts throughout the several views, and in which:

Figs. 1A and 1B show a miniature track diagram and the self-selecting network for the control of the passage of trains through the track layout shown in Fig. 3;

Fig. 3 shows the track layout and the signal control circuits associated with Figs. 1A and 1B;

Figs. 4A and 4B show how the principles of the present invention can be applied to a self-selecting network for the control of a more complex track layout;

Figs. 5A and 5B show a modification of Figs.

Figure 2:
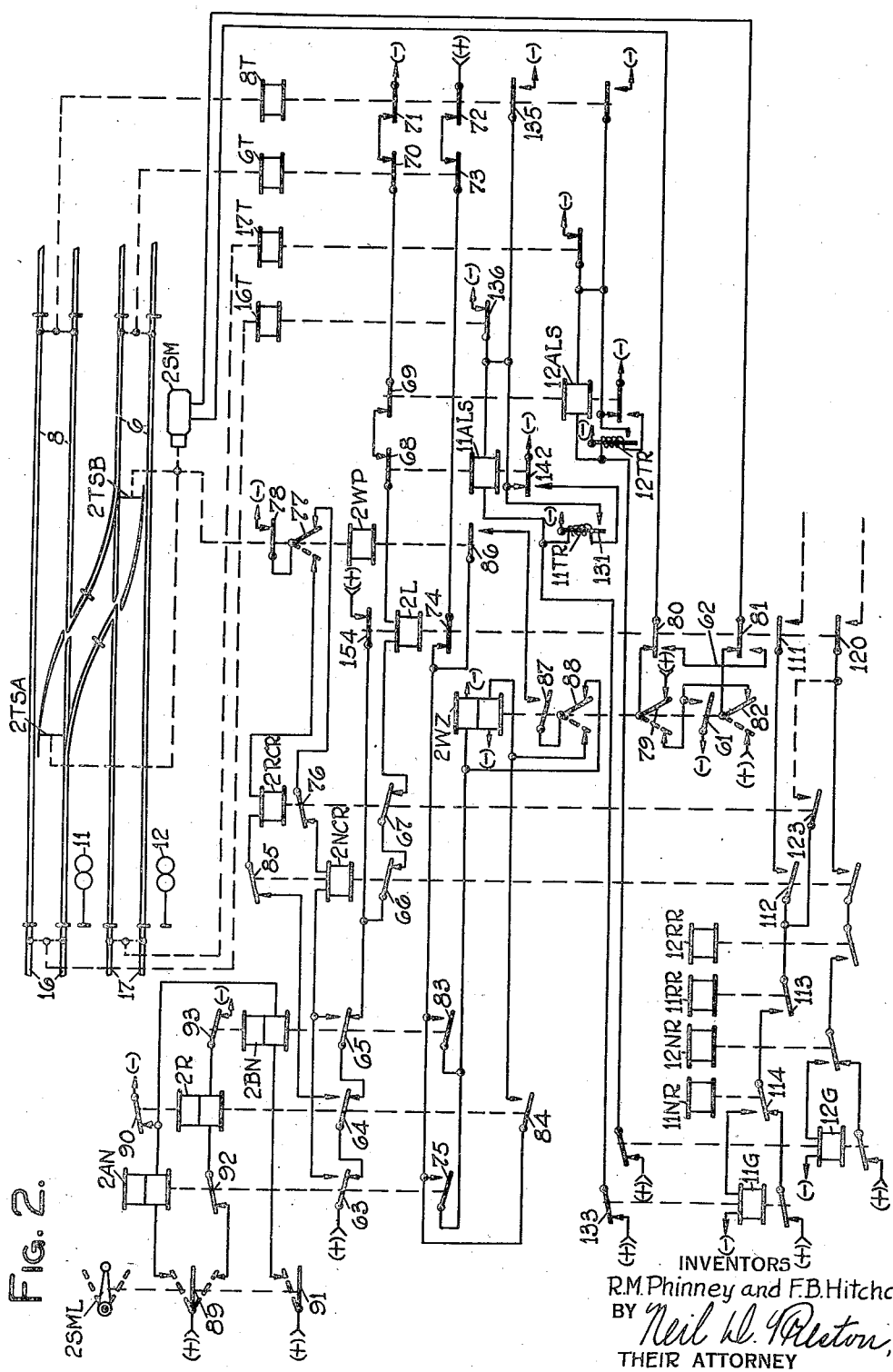
Fig. 2 shows a number of control circuits for certain parts of the system which are to be considered as typical for the control circuits of similar apparatus throughout the interlocking plant.

1A and 1B to illustrate certain equivalent connections in the self-selecting network.

For the purpose of simplifying the illustration and facilitating in the explanation, the various apparatus and circuits constituting the embodiment of the invention have been shown diagrammatically and certain conventional illustrations have been employed for the purpose of simplifying the drawings so as to facilitate the disclosure with reference to principles and mode of operation. Thus, the various relays and their contacts are illustrated in a conventional manner, and symbols are used to indicate connections to terminals of various apparatus, instead of showing all of the wiring connections to these terminals.

The symbols (+) and (—) are employed to indicate the positive and negative current respectively of suitable batteries, or other sources of direct current, and circuits with which these symbols are used always have current flowing in the same direction.

Apparatus

For the disclosure of the present invention it has been assumed that the control office is located near to the track layout, and that all of the relays for the interlocking plant are housed in the control office; however, it is to be understood that the control office could as well be remotely located with reference to the track layout, and that repeater relays could be provided at both the control office and the field location for repeating the conditions of those parts of the system which are located at the remote point. It is also to be understood that polarized circuits could as well be used, in some cases, for controlling the repeater relays, in order to reduce the line wire requirements, all of which changes would merely be the adapting of the principles involved in the present invention to the particular requirements of practice.

*Track layout.*—With reference to Fig. 3 the present embodiment of the invention has been shown as having been applied to the control of a track layout having tracks for a section of double track, connected by crossovers including track switches 2TSA—2TSB and 5TSA—5TSB, and having turn-out tracks connected by single track switches 3TS and 4TS.

Signals 10, 11 and 12 are provided for governing east-bound traffic through the track layout, and signals 13, 14 and 15 are provided for governing west-bound traffic.

Each of the track switches is operated by a power driven switch machine SM, and although a switch machine can be provided for each of the track switches of the crossovers, for the purpose of simplifying the disclosure, only one switch machine has been shown for each crossover. Thus, switch machines 2SM, 3SM, 4SM and 5SM have been shown for their respective crossovers and single track switches, and they may be of any suitable type, such as is shown, for example, in the patent to W. K. Howe, Patent No. 1,466,903, dated September 4, 1923, and they may have their motors controlled in any suitable manner such as is shown, for example, in the patent to W. H. Hoppe et al., Patent No. 1,877,876 dated September 20, 1932. With the switch machine motors controlled as is shown in the Hoppe et al. patent, the relay CR of that disclosure is assumed to have its polarity controlled by relay WZ of the present disclosure.

The signals may be of any one of a number of different types, such as color light, search light, or semaphore signals, but, for the purpose of the present disclosure, color light signals having individual lamp units which provide the usual red indication for stop, and green indication for clear have been shown; and it is to be understood that a caution indication can be provided in the usual manner if such indication is required.

The track layout has been shown as having been divided into track sections, the number of which having been determined by the number of parallel or non-conflicting routes which may be set up; but it is to be understood that the arrangement of track circuits shown has been made only to conform with the usual requirements of practice, and that other track circuit arrangements could as well be used without in any way changing the mode of operation of the system provided by the present invention. The track sections are insulated from each other by the usual insulated joints, and they have track circuits for controlling track relays associated therewith, of which relays 6T, 7T, 8T and 9T have been shown; and it is to be understood that fouling protection is provided at each of the track switches in the usual manner.

A polar-neutral relay WP is provided for each crossover and each single switch, and it is controlled in the usual manner so as to repeat the normal and reverse locked positions of its track switch in correspondence with the positions of the associated switch machine. For the present disclosure, the relay WP is energized to operate its polar contacts to a right hand position when the track switch and switch machine are in a normal locked position; it is energized to operate its polar contacts to a left hand position when the track switch and switch machine are in a reverse locked position; and it is deenergized when either the switch machine or track switch are out of their locked positions or are out of correspondence with each other. The circuit for the control of each of said WP relays is selected through point detector contacts for the track switch with which it is associated as is shown, for example, in the patent to C. S. Bushnell, Pat. No. 1,517,236, dated November 25, 1924.

*Control machine.*—A control machine having a control panel is located in a suitable control office. The control panel has constructed thereon a miniature track diagram (Figs. 1A and 1B) corresponding with the actual track layout in the field (Fig. 3), and its construction may be similar to that shown, for example, in the prior application of S. N. Wight, Ser. No. 69,905, filed March 20, 1936, or as shown in the prior application of F. B. Hitchcock, Ser. N.o 74,709, filed April 16, 1936.

It is to be assumed that suitable indicator lamps are provided on the control panel for keeping the operator fully informed as to the traffic conditions and as to the response of the various control apparatus, all of which has been shown in prior applications such as, for example, the above mentioned Wight application, Ser. No. 69,905, filed March 20, 1936.

Entrance and exit buttons for the ends of the routes are located on the miniature track diagram in positions representative of the route ends with which they are associated. More specifically, an entrance button NB is provided for each of the entrance points of the track layout, and it is readily identified as being associated with the signal for governing the entrance of traffic at that point by its preceding numeral corresponding to the numeral for such signal. The entrance buttons 10NB, 11NB, 12NB, 13NB, 14NB and 15NB have been shown for controlling the entrance of traffic into the routes governed by signals 10, 11, 12, 13, 14 and 15 respectively. An exit button XB is also provided for the end of each route and its position on the miniature track diagram is also representative of the route ends of the actual track layout in the field. The exit buttons have been shown as associated with the signal locations for exit points in the field by means of their preceding numerals although other exit points might be chosen. More specifically, exit buttons 10XB, 11XB, 12XB, 13XB, 14XB and 15XB are associated with the respective ends of the routes of the actual track layout in the field.

Each of the entrance buttons NH are of the stay-where-put type, and they are considered to be in the form of a knob which is rotated 90° from a normal position to an operated position in the direction of traffic which it is to govern. Each button is provided with contacts which are closed when the botton is in an operated position; which contacts have been shown as having been associated with their respective control knobs by means of dotted lines.

Each of the exit buttons XB is of the self-restoring push button type, and it has contacts associated therewith which are closed when the button is depressed. The contacts for the exit buttons have been shown as having been associated with their respective push buttons on the miniature track diagram by means of dotted lines.

Although specific forms of control buttons for the entrance and exit ends of the routes have been chosen to embody the present invention, it it to be understood that any type of control button may be used for the entrance and exit points of the routes, as long as the functions of the control buttons are fulfilled for causing the operation of the self-selecting network shown.

An auxiliary switch control lever SML (Fig. 2) is provided for each crossover and each signal switch so as to effect the operation of the track switch with which it is associated, independently of the route control apparatus. Although only auxiliary control switch 2SML has been shown (see Fig. 2), it is to be understood that an auxiliary control lever is provided for each of the other track switches.

*System devices.*—An entrance relay NR is shown as having been associated with each entrance button as a repeater of the operated position of that button, and, although the relay NR is used to perform a particular function with respect to checking the normal position of certain parts of the system, it is to be understood that the system could as well have been controlled by the contacts of said entrance buttons directly, providing said checking means is not required in practice.

A relay RR is provided for each entrance or exit point in the track layout, and its control is dependent upon the operation of either of the entrance or exit buttons for the point with which it is associated. The contacts of the RR relays for the entrance and exit ends of each route jointly control the positioning of the relays of the self-selecting network which are used for causing the proper positioning of the track switches included in that route.

The neutral relays AN, BN, N and R are associated with the control of the track switches, in accordance with the positioning of said RR relays for the ends of each route. Relays AN, BN and R are employed for causing the positioning of the track switches for each crossover with which they are associated, and relays N and R are employed for causing the positioning of each single track switch. The picking up of these relays causes the operation of the track switch with which it is associated, through the medium of a polar-neutral relay WZ, providing the locking employed renders the control circuits for that track switch effective. Although only relay 2WZ has been shown (Fig. 2), it is to be understood that a relay having similar control circuits is provided for causing the positioning of each of the crossovers and single track switches included in the track layout.

Approach locking is provided through the medium of a relay ALS which is associated with each signal. Associated with the control of each relay ALS, is a thermal relay TR which provides a predetermined time interval between the changing of routes in front of an approaching train. Although thermal relays TR and approach locking relay ALS are provided for each of the signals shown for the track layout, only the detail of the circuits for relays 11ALS, 12ALS, 11TR and 12TR have been shown, but the control of these relays as shown is to be considered as typical for the control of the relays associated with each signal.

A relay L is provided for each crossover and each single track switch for controlling its operation in accordance with the various types of locking employed, such as is shown, for example, in the control of crossover including switches 2TSA and 2TBS (Fig. 2); and although the detail of the controls for the lock relay L for each of the crossovers and track switches has not been shown, it is to be understood that these relays are controlled, in a similar manner to that shown for the control of relay 2L in Fig. 2.

Correspondence relay NCR and RCR are provided for each crossover and single track switch, and they are used in the control of the relays L for the track switches with which they are associated, as well as in the control of the signals for governing traffic over that track switch, and they are energized in accordance with the correspondence positions of the contacts of relays AN, BN, N or R, and relay WP for the track switch with which they are associated. In order to simplify the disclosure only the detail of the control of correspondence relays 2NCR and 2RCR has been shown, and the control of these relays is to be considered as typical of the controls provided for the correspondence relays for each of the crossovers and single track switches included in the track layout.

*Operation*

*Normal conditions.*—Under normal conditions the entrance control buttons on the control panel are in their normal position, such as is shown in Figs. 1A and 1B, with their markers in an upward position; and the indicator lamps (not shown) are normally "dark" to indicate that the interlocking plant is unoccupied and that no routes have been set up.

The relays associated with the control buttons are in a normally deenergized position, and the self-selecting network relays AN, BN, N and R are normally deenergized.

With the interlocking plant unoccupied, the track relays T are all in their energized position;

and with no routes set up, all of the signals at the ends of the routes display a stop indication, or if approach lighting is employed, they will be normally "dark."

The track switches are in the positions required for the last routes set up, and, for the purpose of illustration, all of the track switches have been shown in a normal position, as would have been required for setting up through routes on each of the main tracks.

All of the lock relays L and the approach locking relays ALS are normally energized as is shown typically in Fig. 2, and the detail of the circuits for their control will be considered hereinafter.

*Self-selecting network.*—The relay NR is provided for repeating the position of the entrance button NB with which it is associated, and it may be energized whenever its associated button is in an operated position, providing that the end of the route with which it is associated is not included in a route which is set up. This is true irrespective of the direction of traffic in the route set up, as will be more apparent as the description progresses.

A relay RR is provided for the end of each route and is energized whenever the entrance relay NR or exit button for its end of the route is operated; for example, the relay 11RR is energized whenever button 11NR is picked up or whenever button 11XB is depressed.

The control of the relays AN, BN, N and R, which automatically cause the positioning of all of the track switches between the entrance and exit ends of the particular route being set up, is dependent upon the operation of relays RR for the opposite ends of that route. The picking up of any one relay RR causes the energization of an AN, BN, N or R relay for the track switch nearest to its end of the route or routes terminating at such end providing that the picking up of that one relay RR is sufficient to define the required position of the track switch; but, should the positioning of said track switch be dependent upon the defining of both ends of the route, neither one of said AN, BN, N or R relays is energized until the relays RR for both ends of the route have been picked up.

For example, if signal 12 is to be either an entrance point or an exit point, it is obvious that the track switch 2TSB must be operated to a normal position. Thus, the picking up of relay 12RR can directly pick up the relay 2BN for operating the track switch 2TSB to a normal position irrespective of the particular route which is to be set up past the location of signal 12.

On the other hand, if signal 11 is to be either an entrance point or an exit point, there is no way of determining the position of the track switch 2TSA until the opposite end of the particular route to be set up is taken into consideration. For this reason, the relays 2AN and 2R are made dependent upon route conditions for their energization by suitable circuit selections being controlled jointly by the relay 11RR and the relay RR at the opposite end of the particular route to be set up, or by the relay 11RR and the relay N or R operated directly by the relay RR at the opposite end of the particular route to be set up.

After a relay N or R has been picked up for positioning a track switch, due either to direct control by a relay RR or by a route condition, it serves the purpose of determining the positions of other track switches included in the particular route being set up.

In brief, the picking up of the relays RR for the opposite ends of a particular route energizes directly the N and R relays for those track switches, the positions of which can be arbitrarily determined by consideration of one route end alone, while the remaining track switches have their circuits dependent upon the relay RR at one route end (or an N or R relay controlled directly thereby) and the relay RR at the opposite route end (or a relay N or R directly controlled thereby). With such an arrangement the N and R relays of the self-selecting network are picked up dependent upon one another in such a way that the N and R relays are picked up to establish the route defined by the relays RR energized at the opposite ends. It is of course understood that these N and R relays are so interlocked as to prevent relays for conflicting route from being energized.

After a relay AN, BN, N or R has been picked up for positioning a track switch due to either of the above mentioned two conditions, it serves the purpose of determining the positions of other track switches included in the particular route being set up.

*Setting up a route.*—To set up a route from 11 to 13 the operator may rotate the control button 11NB, in a clockwise direction, to its operated position, so as to cause contact 20 of button 11NB to be closed for energizing relay 11NR from (+), through a circuit including contact 20 of button 11NB in a right hand position, winding of relay 11NR and back contact 21 of relay 11RR, to (−). When relay 11NR picks up, a stick circuit is closed through front contact 22 for shunting out back contact 21 of relay 11RR.

It will be noted at this point that relay 11NR could not have been energized, had relay 11RR for that end of the route been already in an energized position, as would be the case if signal 11 was an exit point for a route which had already been set up, or as would be the case if signal 11 was an entrance point for a route which had been returned to stop but was still occupied by a train.

The picking up of relay 11NR closes a circuit for picking up relay 11RR from (+), through a circuit including front contact 23 of relay 11NR and winding of relay 11RR, to (−).

To define the exit end of the route the operator depresses button 13XB which causes the energizaton of relay 13RR from (+), through a circuit including contact 24 of button 13XB and winding of relay 13RR, to (−).

The required position of track switch 5TSA, for a route including signal 13 as an entrance or exit point, is obviously normal, so relay 5AN is energized whenever relay 13RR picks up, providing there is no conflicting route set up over crossover 5TS in a reverse position. Therefore, after the operator depresses exit buttons 13XB for setting up a route from 11 to 13, relay 5AN is energized from (+), through a circuit including back contact 19 of relay 5R, upper winding of relay 5AN, and front contact 29 of relay 13RR, to (−).

When the signal 11 has been defined as an entrance point (or an exit point) the position of the track switch 2TSA cannot be arbitrarily determined. Nor when the signal 13 has been defined as an exit point (or an entrance point) and the track switch 5TSA having its position determined as normal, can such conditions in themselves determine that the track switch 2TSA shall be normal because a route might well be set up over the track switch 3TS reversed. Also, the track switch 3TS cannot have its position determined by the picking up of the relay 5AN because such track switch 3TS may be used either normal or reverse by a route over the track switch 5TSA normal. Thus, the position of the track switch 2TSA must be determined by the joint operation of the relay 11RR and the relay 5AN. But whenever the track switch 2TSA is to have a route over it in a normal position, it is obvious that the track switch 3TS must also be normal. Thus, the relays 2AN and 3N for the particular route under consideration are connected in multiple and energized dependent upon the energized condition of relays 11RR and 5AN by a circuit closed from (+), through a circuit including front contact 25 of relay 11RR, back contact 26 of relay 2R, upper winding of relay 2AN, back contact 30 of relay 3R, wire 53, and front contact 28 of relay 5AN, to (−); and at the same time relay 3N is energized from (+), through a circuit including front contact 25 of relay 11RR, back contact 26 of relay 2R, upper winding of relay 3N, back contact 30 of relay 3R, wire 53, and front contact 28 of relay 5AN, to (−).

It is obvious that the pick up circuit of relay 13RR remains energized only so long as the exit button 13XB is held in a depressed position until after all of the switch control relays N and R, included in the route being set up, have picked up so as to close a stick circuit for relay 13RR.

After all of the relays used in positioning the track switches included in the route being set up from 11 to 13 have been picked up, as has been described, a stick circuit is closed, for holding relay 13RR in its energized position after the restoration of the push button 13XB to normal, from (+), through a circuit including front contact 23 of relay 11NR, front contact 31 of relay 11RR, front contact 32 of relay 2AN, front contact 33 of relay 3N, wire 50, front contact 34 of relay 5AN, front contact 35 of relay 13RR, and winding of relay 13RR, to (−).

The response of a normal or a reverse control relay N or R for each of the track switches in the route causes the corresponding operation of its track switch as will be typically described in connection with Fig. 2 under the heading "Switch control." Also, following the operation of the track switches in the route, a signal circuit is closed dependent upon the relays RR at the ends of the route and the relay NR at the entrance to the route as will be described in connection with Fig. 3 under the heading "Signal control." However, it is considered desirable to consider further features of operation of the self-selecting network before pointing out the switch and signal operation in detail.

Assuming that the system is restored to normal, as shown, a route may be set up from the signal 10 to the signal 13 in response to the operation of the entrance button 10NB and the exit button 13XB. The consideration of this route with regard to the self-selecting network illustrates the manner in which the N and R relays for a whole route may have direct control by the relays RR at the opposite ends of such route. In other words, a track layout will have various routes some of which include track switches in such a manner that they have direct control, while other routes may include track switches in such a manner that some of them will require direct control and others require control dependent upon route conditions.

More specifically, to set up a route from signal 10 to signal 13, the operator rotates the knob of the entrance button 10NB to an operated position and causes the energization of relay 10NR from (+), through a circuit including contact 142 of button 10NB in an operated position, winding of relay 10NR, and back contact 143 of relay 10RR, to (−). After relay 10NR picks up, its stick circuit is closed from its right hand terminal through a circuit including front contact 144 of relay 10NR, so as to hold that relay in its energized position independently of the operation of relay 10RR.

The relay 10NR closes a circuit for energizing relay 10RR, for the entrance end of the route, from (+), through a circuit including front contact 145 of relay 10NR, and winding of relay 10RR, to (−).

In accordance with the principles of the invention as heretofore described, the picking up of relay 10RR can determine the position of track switch 3TS independently of the exit end of the route, and causes the energization of relay 3R for positioning that track switch, by a circuit closed from (+), through a circuit including front contact 146 of relay 10RR, back contact 147 of relay 3N, and upper winding of relay 3R, to (−).

When the operator depresses the exit button 13XB, for setting up a route from signal 10 to signal 13, relay 13RR is energized, as above pointed out, and the picking up of that relay causes the energization of relay 5AN in a similar manner to that heretofore described.

After the relays 3R and 5AN have been picked up for positioning their respective track switches for a route from signal 10 to signal 13, a stick circuit is closed for holding relay 13RR in its energized position even though the exit button 13XB is restored to a normal position, from (+), through a circuit including front contact 145 of relay 10NR, front contact 148 of relay 10RR, front contact 149 of relay 3R, wire 50, front contact 34 of relay 5AN, front contact 35 of relay 13RR and winding of relay 13RR, to (−).

The energized condition of the relays 10NR, 10RR, 3R, 5AN and 13RR causes the operation of the track switches and the clearing of the signal 10 in a manner which will be described in detail in connection with Figs. 2 and 3.

*Optional routes.*—The arrangement of the track layout is such that optional routes are provided between signals 11 and 14. The present invention provides that the self-selecting network will automatically select or cause to be set up a preferred one of the optional routes under the usual operating conditions when an entrance and an exit button are operated at the opposite ends of such routes, but in the event that the preferred route cannot be set up by reason of a conflicting route or the like, the interior route is automatically set up. Also, in the event that the operator desires to set up the inferior route instead of the preferred route, he may do so by manipulation of the auxiliary switch control levers as will be described in detail hereinafter.

More specifically, the operator may set up a route from signal 11 to signal 14 via track switches 5TSA and 5TSB reversed by merely operating the entrance and exit buttons for that route in the usual manner, but, if such route is not available, the arrangement of the circuits is such that the route from signal 11 to signal 14 via track switches 2TSA and 2TSB reversed is automatically set up upon the operation of the entrance and exit buttons for that route, as would be the case if a route had been set up from signal 10 to signal 13, so as to require track switch 5TSA to be in a normal position. This particular arrangement of the circuits for the self-selecting network causes a route from 11 to 14 via track switches 5TSA and 5TSB in reverse positions to be the preferred route, and causes that route to be set up any time the entrance and exit buttons for that route are operated, providing that route is available and providing that the auxiliary switch control levers for the crossovers and single track switches, included in that route, are in their normal positions; and at any time the route from 11 to 14 via track switches 5TSA and 5TSB in reverse positions is unavailable the inferior route via track switches 2TSA and 2TSB in reverse positions is automatically set up. Although the preferred route has been shown via track switches 5TSA and 5TSB reversed, it is to be understood that the preferred route could have been provided via track switches 2TSA and 2TSB reversed with a similar mode of operation.

The system provides not only that the route from signal 11 to signal 14 will be set up, via track switches 5TSA and 5TSB reversed in accordance with the selections of the self-selecting network, but it also provides that the operator may cause the preferred route from signal 11 to signal 14 to be set up via track switches 2TSA and 2TSB reversed by causing relay 2R, associated with that track switch, to be energized prior to the operation of the control buttons for the entrance and exit ends of the route by operating the lever 2SML (Fig. 2) to a reverse or downward position, in a manner which will hereinafter be described in considering the detail of the switch control circuits.

Let us assume that the operator desires to set up a route from signal 11 to signal 14. He first turns the entrance button 11NB to an operated position thereby causing the energization of relay 11NR, which in turn causes the energization of relay 11RR. He then depresses the button 14XB to cause the energization of relay 14RR from (+), through a circuit including contact 36 of button 14XB in a depressed position and winding of relay 14RR, to (—).

The picking up of relays 11RR and 14RR jointly causes a circuit to be closed for energizing the upper winding of relay 5R from (+), through a circuit including front contact 25 of relay 11RR, back contact 26 of relay 2R, back contact 27 of relay 3R, wire 52, back contact 37 of relay 5AN, upper winding of relay 5R, back contact 38 of relay 5BN, and front contact 39 of relay 14RR, to (—).

At the same time a circuit is closed for energizing relay 2R from (+), through a circuit including front contact 25 of relay 11RR, back contact 40 of relay 2AN, upper winding of relay 2R, back contact 41 of relay 2BN, wire 54, back contact 42 of relay 4R, back contact 43 of relay 5R, and front contact 39 of relay 14RR, to (—).

It is obvious from the description of the control circuits for relays 2R and 5R that the control of each relay includes a selection of a back contact of the other relay so as to cause the control of each of the two relays to be opened whenever the other relay is in a picked up position. Due to the quick acting characteristics of relay 5R with respect to slow acting relay 2R preference is given to relay 5R to determine that the route over crossover 5TS is the preferred one. It is readily apparent that the preferred route could as well have been via crossover 2TS, had relay 2R been a quick acting relay and relay 5R been a slow acting relay.

The picking up of relay 5R closes a circuit for energizing relay 2AN from (+), through a circuit including front contact 25 of relay 11RR, back contact 26 of relay 2R, upper winding of relay 2AN, back contact 30 of relay 3R, wire 53, back contact 28 of relay 5AN, front contact 43 of relay 5R and front contact 39 of relay 14RR, to (—); and at the same time a circuit is closed for energizing relay 3N from (+), through a circuit including front contact 25 of relay 11RR, back contact 26 of relay 2R, upper winding of relay 3N, back contact 30 of relay 3R, wire 53, back contact 28 of relay 5AN, front contact 43 of relay 5R, and front contact 39 of relay 14RR, to (—).

After relays 5R, 2AN and 3N have picked up, a circuit is closed for holding relay 14RR in its energized position from (+), through a circuit including front contact 23 of relay 11NR, front contact 31 of relay 11RR, front contact 32 of relay 2AN, front contact 33 of relay 3N, wire 50, front contact 18 of relay 5R, front contact 44 of relay 14RR and winding of relay 14RR, to (—).

The energized condition of the relays 11NR, 11RR, 2AN, 3N, 5R and 14RR causes the operation of the track switches and the clearing of the signal 11 in a manner which will be described in detail in connection with Figs. 2 and 3.

Had the route from signal 11 to signal 14 been unavailable via track switch 5TSA reversed, as would have been the case if a route from signal 10 to signal 13 had been set up, the control of relay 5R would have been opened at front contact 37 of relay 5AN, so as to allow the slow acting relay 2R to pick up.

Assuming such conflict to exist, a circuit is closed for energizing relay 5BN, after relay 2R is picked up, from (+), through a circuit including front contact 25 of relay 11RR, front contact 26 of relay 2R, wire 55, back contact 17 of relay 4R, upper winding of relay 5BN, back contact 43 of relay 5R and front contact 39 of relay 14RR, to (—); and at the same time a circuit is closed for energizing relay 4N from (+), through a circuit including front contact 25 of relay 11RR, front contact 26 of relay 2R, wire 55, back contact 17 of relay 4R, upper winding of relay 4N, back contact 43 of relay 5R and front contact 39 of relay 14RR, to (—).

As soon as the relays 2R, 4N and 5BN are picked up, a stick circuit is closed for the relay 14RR from (+), through a circuit including front contact 23 of relay 11NR, front contact 31 of relay 11RR, front contact 47 of relay 2R, wire 51, front contact 48 of relay 4N, front contact 49 of relay 5BN, front contact 44 of relay 14RR, windings of relay 14RR, to (—).

With the relays 11NR, 11RR, 2R, 4N, 5BN and 14RR picked up, the track switches are caused to assume proper positions to set up the route and the signal 11 is caused to be cleared in a manner which will be readily understood after a consideration of Figs. 2 and 3 given in detail hereinafter.

It is obvious that if the operator causes the energization of relay 2R, due to the operation of lever 2SML to a reverse or downward position, prior to the operation of the entrance and exit buttons for the route from signal 11 to signal 14, the control of relay 5R is opened at back contact 26 of relay 2R so as to cause the setting up of a route from signal 11 to signal 14 via crossover 2TS in a similar manner to that above described.

Although the lower windings of the switch control relays N and R have been provided essentially for the control of these relays by the operation of their auxiliary levers SML for the track switches with which they are associated, as shown in Fig. 2, use is also made of the lower windings of certain of these relays to provide derail protection.

For example, when a route is set up over crossover 2TS in a reverse position, relay 3R is picked up, so as to cause its associated track switch to be operated to a reverse position, by a circuit closed from (+), through a circuit including front contact 150 of relay 2R, back contact 152 of relay 3N, and lower winding of relay 3R, to (—). It is to be understood that the lever 3SML is used for also energizing the lower winding of relay 3R in a similar manner to that typically shown for lever 2SML (Fig. 2), and that the control circuit from lever 3SML is represented as tying in with the circuit just described for the control of the lower winding of relay 3R, at wire 153.

Similar derail protection is provided by use of track switch 4TS, but it is considered unnecessary to describe the circuits for relay 4R in detail, as it is obvious that the mode of operation is identical with that just described in considering the derail protection provided by track switch 3TS.

Having described the setting up of various routes through the track layout, it is to be understood that the setting up of these routes is representative of the mode of operation of the system for setting up any of the other routes available, and that routes may be set up for the passage of west-bound trains in a similar manner to that just described, in which the same circuits are used for the control of the network relays as has heretofore been described in setting up routes for east-bound trains; for example, the operation of the entrance button 13NB to an operated position causes the energization of the relay 13NR, which in turn causes the energization of relay 13RR, all in a manner identical to that previously described with reference to the operation of entrance buttons for the west ends of the routes, and the depressing of the exit button 10XB, following the operation of the entrance button 13NB causes a route to be set up from 13 to 10 after relays 13RR and 10RR have been picked up so as to cause the picking up of relays 5AN and 3R through circuits heretofore described with reference to the setting up of the same route for traffic in the opposite direction.

The control of each normal switch control relay N includes a back contact selection on the reverse switch control relay R for the track switch with which it is associated; and similarly, the control of each reverse switch control relay R includes a back contact selection on each normal switch control relay N for the track switch with which it is associated. For example, after a route has been set up from signal 11 to signal 13, the picking up of relay 3R for setting up a conflicting route from signal 10 to signal 13 is prevented because the control of that relay is open at back contact 147 of relay 3N. In this manner a route once set up is given complete protection against all conflicting routes.

The pre-conditioning of routes is prevented inasmuch as the stick circuits for relays RR associated with the exit ends of those routes are dependent upon a front contact on each of the switch control relays N and R included in such routes. Thus, a relay RR, associated with the exit end of a route, is always deenergized as soon as the exit button for that end of the route is restored to a normal position, in the event that only a portion of the self-selecting network relays have been picked up. Under such conditions the operator must depress the exit button a second time, after the network relays for conflicting routes have been restored to normal.

*Switch control.*—Under normal conditions, the lock relays L for the respective crossovers and track switches are in their energized positions. For example, the relay 2L (Fig. 2) is energized from (+), through a circuit including back contact 63 of relay 2AN, back contact 64 of relay 2R, back contact 65 of relay 2BN, back contact 66 of relay 2NCR, back contact 67 of relay 2RCR, winding of relay 2L, front contact 68 of relay 11ALS, front contact 69 of relay 12ALS, front contact 70 of relay 6T, and front contact 71 of relay 8T, to (—).

With relay 2L picked up, a stick circuit is closed for holding that relay in its picked up position only until the switch machine 2SM has completed its operation in response to the switch control relays 2AN—2R—2BN.

This stick circuit is closed from (+), through a circuit including front contact 154 of relay 2L, back contact 66 of relay 2NCR, back contact 67 of relay 2RCR, winding of relay 2L, front contact 68 of relay 11ALS, front contact 69 of relay 12ALS, front contact 70 of relay 6T, and front contact 71 of relay 8T, to (—).

When the lock relay L for a track switch or cross-over is picked up, the picking up of a normal or reverse switch control relay N or R for that track switch, when a route is being set up, as has been shown when considering the operation of the self-selecting network, causes the energization of a polar-neutral switch control relay WZ, which in turn causes energy to be applied to the switch machine SM for the track switch TS with which it is associated.

More specifically, when a route is being set up which requires track switch 2TSA to be in a normal position, and relay 2AN is picked up, a circuit is closed for energizing the upper winding of relay 2WZ from (+), through a circuit including front contact 72 of relay 8T, front contact 73 of relay 6T, front contact 74 of relay 2L, front contact 75 of relay 2AN and upper winding of relay 2WZ, to (—).

It is obvious that a similar circuit is closed for relay 2WZ if relay 2BN is energized which circuit includes front contact 83 instead of front contact 75. Of course, in the case of parallel routes, both front contacts 75 and 83 are closed.

The picking up of relay 2WZ, due to the energization of its upper winding, with relay 2L in an energized position, applies energy to the motor control of the switch machine 2SM from (+), through a circuit including polar contact 79 of relay 2WZ in a right hand position, front contact 80 of relay 2L, motor control for switch machine 2SM, front contact 81 of relay 2L, polar contact 82 of relay 2WZ in a right hand position and front contact 61 of relay 2WZ, to (—).

After the switch machine 2SM has completed its operation to a normal locked position in correspondence with the position of relay 2AN, the relay 2NCR is picked up, which in turn causes relay 2L to drop by opening back contact 66 and cause a shunt circuit including back contact 80 of relay 2L, wire 62 and back contact 81 of relay 2L, to be placed across the motor control of the switch machine 2SM. The relay 2WZ is also deenergized by the opening of front contact 74 which further opens the motor control circuit at open front contact 61.

If the last operated position of the track switch 2TSA is a normal position, the picking up of relay 2AN immediately causes relay 2NCR to be energized from (+), through a circuit including front contact 63 of relay 2AN, winding of relay 2NCR, back contact 76 of relay 2RCR, polar contact 77 of relay 2WP in a right hand position, and front contact 78 of relay 2WP, to (—). But, if the last operated position of track switch 2TSA is a reverse position, it is obvious that relay 2NCR will remain in a deenergized position until the track switch 2TSA has been operated to a normal and locked position.

The dropping away of the lock relay 2L also closes the signal control circuits at back contacts 111 and 120, in a manner to be discussed later with reference to the control of the signals.

It is obvious that the switch machine 2SM is caused to be operated to a normal and locked position when relay 2BN of the self-selecting network is energized by reason of a circuit for energizing the upper winding of relay 2WZ being closed at front contact 83. Under such conditions, the correspondence relay 2NCR is energized, when the relay 2WP is in correspondence with the picked up position of relay 2BN, by a circuit closed from (+), through a circuit including back contact 63 of relay 2AN, back contact 64 of relay 2R, front contact 65 of relay 2BN, winding of relay 2NCR, back contact 76 of relay 2RCR, polar contact 77 of relay 2WP in a right hand position, and front contact 78 of relay 2WP, to (—).

If the relay 2R is energized to set up a route, a circuit is closed for energizing the lower winding of relay 2WZ from (+), through a circuit including front contact 72 of relay 8T, front contact 73 of relay 6T, front contact 74 of relay 2L, front contact 84 of relay 2R, and lower winding of relay 2WZ, to (—). The picking up of relay 2R closes a circuit for energizing relay 2RCR after the track switch has operated to a corresponding and locked position from (+), through a circuit including back contact 63 of relay 2AN, front contact 64 of relay 2R, back contact 85 of relay 2NCR, winding of relay 2RCR, polar contact 77 of relay 2WP in a left hand position, and front contact 78 of relay 2WP, to (—).

This energization of the lower winding of relay 2WZ causes its contacts to operate to left hand positions to apply energy to the switch machine 2SM for causing its operation to a reverse position, providing relay 2L is in a picked up position, from (+), through a circuit including polar contact 82 of relay 2WZ in a left hand position, front contact 81 of relay 2L, motor control for switch machine 2SM, front contact 80 of relay 2L, polar contact 79 of relay 2WZ in a left hand position and front contact 61 of relay 2WZ, to (—).

After the track switch has completed its operation to a reverse and locked position, the relay 2RCR picks up by reason of a circuit closed from (+), through a circuit including back contact 63 of relay 2AN, front contact 64 of relay 2R, back contact 85 of relay 2NCR, windings of relay 2RCR, polar contact 77 of relay 2WP in a left hand position, front contact 78 of relay 2WP, to (—). The picking up of relay 2RCR opens the control for relay 2L at back contact 67, so as to cause that relay to drop away and to cause a shunt to be applied across the control wires for switch machine 2SM and close the signal clearing circuits, as was previously described.

Although the relay 2WZ has its pick up circuit closed only while one of the switch control relays 2AN, 2BN, or 2R is picked up, it is maintained in its last energized position until the switch machine 2SM has completed its operation by reason of a stick circuit closed from (+), through a circuit including front contact 72 of relay 8T, front contact 73 of relay 6T, front contact 74 of relay 2L, back contact 86 of relay 2WP, front contact 87 of relay 2WZ, polar contact 88 of relay 2WZ in a right hand position and upper winding of relay 2WZ, to (—), providing that the route which is being set up required the track switches for the crossover to be in normal positions. However, if the route being set up requires the switches for the crossover to be operated to reverse positions, the stick circuit is closed for energizing the lower winding of relay 2WZ from (+), through a circuit including front contact 72 of relay 8T, front contact 73 of relay 6T, front contact 74 of relay 2L, back contact 86 of relay 2WP, front contact 87 of relay 2WZ, polar contact 88 of relay 2WZ in a left hand position and winding of relay 2WZ, to (—). It is obvious that with relays 2L and 2WZ in energized positions, energy is applied for completing the operation of the switch machine 2SM, even though the switch control relays of the self-selecting network have been returned to their normal position.

It will be noted that the energizing circuit for relay 2L is selected through back contacts 63, 64 and 65 of relays 2AN, 2BN and 2R respectively, so as to allow the picking up of that relay only after the relays 2AN, 2BN and 2R have been restored to normal positions. This system of control for the lock relay L provides what is conveniently termed "electric lever lock equivalent" because the parts of the self-selecting network, associated with the control of that track switch, must be restored to normal before the electric locking will permit any changes to be made in the position of that track switch.

Due to the fact that it is desirable at times to cause the operation of a particular track switch or crossover independently of any particular route, an auxiliary switch control lever SML is provided for each single switch and each crossover. The operation of lever SML to a particular position such as an upward position causes the track switch with which it is associated to be operated to a normal locked position, and the operation of that control switch to another position, such as a downward position, causes the track switch to be operated to a reverse locked position.

The operation of the lever 2SML in an upward position, which is typical for all of the others, causes the energization of the lower winding of relay AN (relay N for a single switch) by a circuit closed from (+), through a circuit including contact 89 of lever 2SML in an upward position, lower winding of relay 2AN, and back contact 90 of relay 2R, to (—); and relay 2BN is energized at the same time by a circuit closed from (+), through a circuit including contact 91 of lever SML in an upward position, lower winding of relay 2BN and back contact 90 of relay 2R, to (—).

If the lever 2SML is operated to a lower position relay 2R is energized by a circuit closed from (+), through a circuit including contact 89 of lever 2SML in a lower position, back contact 92 of relay 2AN, lower winding of relay 2R and back contact 93 of relay 2BN, to (—).

Having thus described in detail many of the circuits with respect to the control of the track switches for the crossover 2TS, it is to be understood that such circuits are typical of those circuits employed in controlling each of the other crossovers and single track switches included in the track layout.

*Signal control.*—The control circuit for the signals are selected in accordance with the energized positions of the correspondence relays NCR and RCR for the track switches included in the route being set up as soon as the lock relays for such track switches included in the route have dropped away. This checks the locked condition of the track switches, before the signal for the route can be cleared. The direction of traffic is determined by the end at which the relay NR is energized.

Relay 10G for clearing signal 10 is energized for a route from signal 10 to signal 13, from (+), through a circuit including back contact 94 of relay 13G, back contact 95 of relay 13NR, front contact 96 of relay 13RR, front contact 97 of relay 5NCR, back contact 98 of relay 5L, back contact 99 of relay 3L, front contact 100 of relay 3RCR, front contact 101 of relay 10RR, front contact 102 of relay 10NR and winding of relay 10G, to (—). The picking up of relay 10G applies energy to the control wire for the green lamp in signal 10, through a circuit including front contact 103 of relay 10G.

Relay 11G can be energized, after the track switches have been operated to proper locked positions for setting up a route from signal 11 to signal 13, by a circuit closed from (+), through a circuit including back contact 94 of relay 13G, back contact 95 of relay 13NR, front contact 96 of relay 13RR, front contact 97 of relay 5NCR, back contact 98 of relay 5L, back contact 99 of relay 3L, front contact 110 of relay 3NCR, back contact 111 of relay 2L, front contact 112 of relay 2NCR, front contact 113 of relay 11RR, front contact 114 of relay 11NR, and winding of relay 11G, to (—). When relay 11G picks up, energy is applied for energizing the green lamp in signal 11, through a circuit including front contact 115 of relay 11G.

For setting up a route from signal 11 to signal 14 via crossover 5TS reversed, relay 11G is energized for clearing signal 11 by a circuit closed from (+), through a circuit including back contact 104 of relay 14G, back contact 105 of relay 14NR, front contact 106 of relay 14RR, front contact 107 of relay 5RCR, back contact 108 of relay 4L, front contact 109 of relay 4RCR, back contact 98 of relay 5L, back contact 99 of relay 3L, front contact 110 of relay 3NCR, back contact 111 of relay 2L, front contact 112 of relay 2NCR, front contact 113 of relay 11RR, front contact 114 of relay 11NR, and winding of relay 11G, to (—).

When a route from signal 11 to signal 14 is set up via crossover 2TS, relay 11G is energized from (+), through a circuit including back contact 104 of relay 14G, back contact 105 of relay 14NR, front contact 106 of relay 14RR, back contact 107 of relay 5NCR, front contact 116 of relay 5NCR, back contact 117 of relay 5L, front contact 118 of relay 4NCR, back contact 119 of relay 4L, back contact 120 of relay 2L, back contact 121 of relay 3L, front contact 122 of relay 3RCR, front contact 123 of relay 2RCR, front contact 113 of relay 11RR, front contact 114 of relay 11NR, and winding of relay 11G, to (—).

It will be noted that signal 11 can be cleared for a route from 11 to 14 via crossover 2TS, only after the track switch 3TS has operated to a reverse and locked position in accordance with the derail protection provided for that route in the manner described heretofore when considering the operation of the self-selecting network.

Having described in detail the control circuits for clearing signals 10 and 11 for certain routes emanating from those points, it is to be understood that signals for other routes may be cleared in a similar manner, and that signals for westbound trains are cleared in accordance with the energization of their associated relay G through similar circuits as heretofore described for clearing east-bound signals for the same routes; for example, relay 13G is energized, for clearing signal 13 when a route is set up from 13 to 10, from (+), through a circuit including back contact 132 of relay 10G, back contact 102 of relay 10NR, back contact 101 of relay 10RR, front contact 100 of relay 3RCR, back contact 99 of relay 3L, back contact 98 of relay 5L, front contact 97 of relay 5NCR, front contact 96 of relay 13RR, front contact 95 of relay 13NR, and winding of relay 13G, to (—).

*Approach and route locking.*—When a signal has been cleared after the route has been set up, the self-selecting network is so organized that the switch control relays N and R for the track switches in such route are maintained energized so long as such signal is cleared and a predetermined time after that signal is restored to stop if such restoration occurs while a train is approaching the cleared signal. If there is no train approaching, the restoration of a cleared signal to a stop condition allows the immediate release of the switch control relays in the network for the route governed by such signal so that their corresponding track switches may be employed in other routes. When a cleared signal for a particular route is put to stop after a train has accepted such signal, then suitable route locking becomes effective to maintain the switch control relays energized for that route until the train has entirely passed beyond the route.

The holding of the network upon the clearing of the signal for each route set up by the network and the approach locking for such signals and time release therefor, is accomplished through the medium of an approach locking stick relay ALS and a thermal relay TR for each of the signals. Due to the fact that each signal employs a similar approach and route locking means, the disclosure has been limited to illustrating only the relays 11ALS and 12ALS with their respective controls, and such circuit arrangement is intended to be typical for each of the signals.

With reference to Fig. 2 of the accompanying drawings, it will be apparent that the relay 11ALS is normally energized by a circuit closed from (+), through a circuit including back contact 133 of relay 11G, windings of relay 11ALS, front contact 136 of relay 16T, to (—).

When the signal 11 is cleared by the energization of the relay 11G, this pick-up energizing circuit for relay 11ALS is opened at back contact 133 of 11G so that the relay 11ALS immediately drops away. Assuming that the operator has operated the entrance button 11NB and the exit button 13XB causing the energization of the relays 11RR and 13RR followed by the operation of the self-selecting network to establish a route between the signals 11 and 13, the dropping away of the relay 11ALS provides stick circuits for both of the relays 11RR and 13RR in multiple (see Figs. 1A and 1B).

More specifically, the stick circuit for the relay 11RR is closed from (+), through a circuit including back contact 137 of relay 11ALS, front contact 31 of relay 11RR, windings of relay 11RR, to (—). In multiple with this stick circuit for relay 11RR is a stick circuit through relay 13RR closed from (+), through a circuit including front contact 137 of relay 11ALS, front contact 32 of relay 2AN, front contact 33 of relay 3N, wire 50, front contact 34 of relay 5AN, front contact 35 of relay 13RR, windings of relay 13RR, to (—).

When the operator restores the entrance button 11NB to a stop position with no train approaching the signal 11, then the relay 11ALS immediately picks up upon the deenergization of the relay 11G because of closed contacts 133 and 136. However, if the relay 11G for some reason should remain energized irrespective of the deenergization of the entrance relay 11NR, then the signal would remain clear and the relay 11ALS would remain deenergized holding the route in a locked condition by maintaining the relays 11RR and 13RR energized.

In other words, so long as the route end relays RR for the opposite ends of a route are maintained energized, the self-selecting network maintains the switch control relays in the positions proper for maintaining such route.

Assuming that the signal 11 does go to stop and the relay 11ALS picks up in response to the restoration of the entrance button 11NB, then the route end relays 11RR and 13RR are deenergized which in turn deenergizes the relays 2AN, 3N and 5AN, so that the system is restored to normal conditions.

With a train approaching the signal 11 at stop, the track relay 16T for the approach track section is deenergized opening front contact 136, but the relay 11ALS is maintained energized by reason of its stick circuit closed from (+), through a circuit including back contact 133 of relay 11G, windings of relay 11ALS, front contact 142 of relay 11ALS, to (—).

Under such conditions, as soon as the signal 11 clears upon the operation of the entrance button 11NB and the exit button 13XB, for example, the relay 11ALS is deenergized at back contact 133 of relay 11G, so that the self-selecting network is maintained energized for the route from signal 11 to signal 13 although the operator may restore the entrance button 11NB to its stop position putting the signal 11 to stop in the face of the oncoming train. This is because the open contact 136 of the approach track relay 16T prevents the closure of the pick-up circuit for the relay 11ALS above pointed out, and must depend for its pick up energy upon an auxiliary pick-up circuit which is closed only after a predetermined time has been measured off by its thermal relay 11TR. During such predetermined time, energy is applied to the stick circuits for route end relays 11RR and 13RR at back contact 137 of relay 11ALS as above pointed out (see Figs. 1A and 1B).

Assuming the signal 11 to be returned to stop with a train approaching, the deenergization of the relay 11G closes an energizing circuit for the thermal relay 11TR from (+), through a circuit including back contact 133 of relay 11G, heating element of the thermal relay 11TR, back contact 142 of relay 11ALS, to (—). After a time, the contact 131 of the thermal relay 11TR closes its front points to complete a pick-up circuit for the relays 11ALS from (+), through a circuit including back contact 133 of relay 11G, windings of relay 11ALS, front contact 131 of the thermal relay 11TR, to (—). The energy which flows in this pickup circuit causes the relay 11ALS to be immediately picked up closing front contact 142 to maintain such relays 11ALS energized and to deenergize the thermal relay 11TR at open back contact 142.

In this way, the relay ALS for each signal is capable of maintaining the network for the particular route emanating from such signal in accordance with the cleared condition of such signal and the approach locking conditions by applying energy to the stick circuits for the route end relays RR at the opposite ends of such route. It will be apparent that these stick circuits are closed by the switch control relays of the self-selecting network as previously pointed out so that the closure of back contact 137 of relay 11ALS applies energy to the associated relay 11RR and any particular relay RR at the opposite end of the route then emanating from signal 11 irrespective of the track layout. Above it was specifically pointed out how relay 13RR is maintained energized over such selected stick circuit, but in a similar manner the relay 15RR may be maintained energized by the closure of back contact 137 when a route is set up between signals 11 and 15.

It may happen that a train accepts a signal for passing over a route and it is desirable to clear the signal in the rear of such train for allowing a closely following train to immediately proceed over the route thus occupied. This is possible in accordance with some signalling rules and is accomplished by this system inasmuch as the reenergization of the entrance relay 11NR immediately allows the signal 11 to be cleared. Under such circumstances, however, the self-selecting network is maintained so as to hold that route locked irrespective of the shift in the condition of the entering signal 11.

This is because of the route lock which becomes effective as soon as a train enters a route. For example, assuming a route to be set up from the signal 11 to the signal 13, the train accepting such signal 11 causes the deenergization of the track relay 8T which applies energy to the stick circuits for the relays 11RR and 13RR in multiple. More specifically, the circuit for the relay 11RR is closed from (+), through a circuit including back contact 138 of relay 8T, front contact 31 of relay 11RR, windings of relay 11RR, to (—). The stick circuit for the relay 13RR is closed from (+), back contact 138 of relay 8T, front contact 32 of relay 2AN, front contact 33 of relay 3N, wire 50, front contact 34 of relay 5AN, front contact 35 of relay 13RR, windings of relay 13RR, to (—).

As the train proceeds through the route onto track section 9T energy is applied to the stick circuits for relays 11RR and 13RR through back contact 139 and these relays are maintained energized although the track relay 8T picks up after the train passes such section.

More specifically, the circuit for relay 11RR is closed from (+), through a circuit including back contact 139 of relay 9T, wire 50, front contact 33 of relay 3N, front contact 32 of relay 2AN, front contact 31 of relay 11RR, windings of relay 11RR, to (—). A similar circuit is closed for the relay 13RR from (+), through a circuit including back contact 139 of relay 9T, front contact 34 of relay 5AN, front contact 35 of relay 13RR, windings of relay 13RR, to (—).

When the train passes entirely out of the route the relays 11RR and 13RR are of course deenergized, but in the situation under consideration where a train is immediately following, the clearing of the signal and dropping of the relay 11ALS and the acceptance of the signal and deenergization of the relay 8T would retain the relays 11RR and 13RR energized before the first train passes beyond the limits of the route.

Under such circumstances, it is unnecessary to provide for the release of the relay 11ALS independent of the time element because there is to be no change in the route which the second train is to take.

It is to be noted that the track relays upon becoming deenergized apply energy to that portion of the stick circuits for the relays RR included in the route which is then set up. In other words, there are circuit portions for the relays RR to conform to the track layout so that when a particular route is set up, there is a circuit extending between the relay RR at one end and the relay RR at the other end. This circuit for each route has energy applied thereto by the approach locking stick relay for the entering end and also has energy applied thereto by the track relays for each of the track sections in the route as they become deenergized upon the passing of the train through the route.

The stick circuits for the route end relays RR at the opposite ends of the routes are similar for the various routes as above described, and the remaining stick circuits for the routes which can be set up, will not be pointed out in detail because it is believed that they will be readily understood by analogy to the conditions specifically described in connection with the establishment and locking of the route between signals 11 and 13. It should also be noted that these stick circuits are used for both directions of traffic.

*Self-selecting network for complicated track layouts.*—To illustrate more completely the principles underlying the control of the switch control relays N and R of the self-selecting network, the control of such relays has been shown for a track layout having four tracks interconnected by a series of crossovers in such a manner that a route can be set up from each track to any one of the other three tracks (Figs. 4A and 4B). Although a symmetrical track layout has been shown in order to more clearly set forth the principles involved, it is to be understood that these principles may as well be applied to the control of complicated track layouts that are unsymmetrical.

In order to most clearly illustrate the principles of operation, this network has a track layout of the single line type shown just above the circuits with various parts of the control machine and intervening control apparatus, such as disclosed in the Figs. 1, 2 and 3, omitted.

Although certain of the details of the control machine have not been shown in connection with the track layout shown in Figs. 4A and 4B, it is to be understood that such details are provided in identically the same manner as has been shown and described heretofore in the disclosure.

The principles involved in the control of the switch control relays AN, BN and R of Figs. 4A and 4B are the same as used in controlling the switch control relays of the self-selecting network shown in Figs. 1A and 1B, but certain added features are also employed by reason of the arrangement of the track layout. These added features will be discussed in detail hereinafter.

Let us assume that the operator desires to set up a route between the signals 210 and 214. To do this he operates an entrance button for one end and an exit button for the opposite end of such route, but irrespective of the direction of traffic to be established, the relays 210RR and 214RR are energized and picked up in a manner specifically and typically described in connection with Figs. 1A and 1B.

It will be apparent that the track switch 200TSA cannot have its position determined by the picking up of the route end relay 210RR alone, nor can the position of the track switch 205TSA be determined by such relay 210RR because the track switches 200TSA—200TSB might be reversed with such relay 210RR picked up for a route to signal 217, for example. Obviously, the converse is true with respect to the control which may be effected by the picking up of the relay 214RR alone.

In other words, the position of the track switch 200TSA must be determined in accordance with route conditions. On this basis the relay 200AN is made dependent for its pick up energy upon both of the relays 210RR and 214RR. Whenever a route is set up over the track switch 200TSA in a normal position, it is readily apparent that the track switch 205TSA must also be in a normal position, and for this reason the relays 200AN and 205AN are so connected as to be controlled in multiple. The relay 205AN could be made a repeater of relay 200AN, but because of the symmetry of the track layout both relays are connected in multiple.

With both of the relays 210RR and 214RR picked up, a circuit is closed for energizing relay 200AN from (+), through a circuit including front contact 220 of relay 210RR, back contact 221 of relay 200R, upper winding of relay 200AN, wire 289, back contact 222 of relay 205R, and front contact 223 of relay 214RR, to (—). At the same time relay 205AN is energized by a multiple circuit closed from (+), through a circuit including front contact 220 of relay 210RR, back contact 224 of relay 200R, wire 288, upper winding of relay 205AN, back contact 225 of relay 205R, and front contact 223 of relay 214RR, to (—).

After relays 200AN and 205AN have picked up, for a route from 210 to 214, a stick circuit is closed, for holding relay 214RR in its energized position after the exit button 214XB (not shown) has been restored to its normal position, from (+), through a circuit including a front contact of relay 210NR (not shown), wire 282, front contact 226 of relay 210RR, front contact 227 of relay 200AN, wire 284, front contact 228 of relay 205AN, front contact 229 of relay 214RR, and winding of relay 214RR, to (—). The circuit portions of this stick circuit are also assumed to have associated approach and route locking control as shown for similar circuits in Figs. 1A and 1B.

This route may be set up between signals 210 and 214 independently of any non-conflicting routes which may have been set up in other parts of the track layout, as for example, a route between signals 211 and 215.

It is also to be understood that the picking up of relays 200AN and 205AN causes the operation of the switch machines for the crossovers with which they are associated as has been typically shown and described in connection with Fig. 2.

After the track switches included in the route set up have been positioned and locked, the signal for the end of that route which has its relay NR picked up is caused to clear in a similar manner to that shown and described in connection with Fig. 3.

For a route from 211 to 215 it is obvious that the positioning of the track switch 200TSB and the track switch 205TSB is clearly defined by the picking up of the RR relay for the end of the route with which that track switch is associated, therefore, the picking up of relay 211RR causes the picking up of relay 200BN, independent of the exit end of the route; and relay 200BN is energized under these conditions from (+), through a circuit including front contact 230 of relay 211RR, upper winding of relay 200BN and back contact 231 of relay 200R, to (—).

In a similar manner the picking up of relay 215RR defines the position of the track switch 205TSB and causes the energization of relay 205BN from (+), through a circuit including front contact 232 of relay 215RR, upper winding of relay 205BN, and back contact 233 of relay 205R, to (—).

Having thus been picked up for a route from 211 to 215, relays 200BN and 205BN act in a similar capacity to the RR relays for the ends of the route in causing the picking up of relays 201AN and 204AN, for causing the operation of their respective track switches to a normal position.

Under these conditions relay 201AN is energized from (+), through a circuit including front contact 234 of relay 200BN, back contact 235 of relay 201R, upper winding of relay 201AN, wire 291, back contact 236 of relay 204 R and front contact 237 of relay 205BN, to (—).

At the same time a circuit is closed for energizing the upper winding of relay 204AN from (+), through a circuit including front contact 238 of relay 200BN, back contact 239 of relay 201R, wire 290, upper winding of relay 204AN, back contact 240 of relay 204R, and front contact 241 of relay 205BN, to (—).

In comparing the setting up of routes from signal 210 to signal 214 and from signal 211 to signal 215, it will be noted that the relays 201AN and 204AN were picked up in accordance with the energized position of relay 200BN and 205BN, in identically the same manner in which relays 200AN and 205AN were picked up for a route from signal 210 to signal 214, in accordance with the picking up of relays 210RR and 214RR for the ends of the route. Had other track switches been included in the route from signal 211 to signal 215 between track switches 201TSA and 204TSA, the picking up of relays 201AN and 204AN would have caused these relays to act in a similar capacity to the RR relays in defining the ends of the route with respect to the other track switches included between track switch 201TSA and track switch 204TSA.

After all of the relays included in the route from 211 to 215 have picked up, a circuit is closed for holding relay 215RR in its energized position after the exit button 215XB (not shown) has been restored to its normal position, from (+), through a circuit including front contact of relay 211RR (not shown), wire 283, front contact 242 of relay 211RR, front contact 243 of relay 200BN, front contact 244 of relay 201AN, wire 285, front contact 245 of relay 204AN, front contact 246 of relay 205BN, front contact 247 of relay 215RR, and winding of relay 215RR, to (—).

A further illustration of the principles involved in the control of the AN, BN and R relays for the self-selecting network is shown in setting up a route from 210 to 217, in which the picking up of relay 210RR for the entrance end of the route does not independently effect the positioning of crossover 200TS, and in which the picking up of relay 217RR directly causes the picking up of relay 203BN, due to the track switch 203TSB being a trailing point switch with respect to the exit end of the route. After relay 203BN picks up, that relay causes the energization of relay 200R, the picking up of relay 200R causes the energization of relay 201R, and the picking up of relay 201R causes the energization of relay 202R; thus, it is shown that a relay for the normal position of a track switch is picked up first, and that after this relay picks up, it defines the exit end of the route for picking up the relays for the reverse position of track switches for the remaining crossovers in a consecutive order, starting from the track switch nearest the entrance end of the route.

After the RR relays for the ends of the route from 210 to 217 have picked up, a circuit is closed for energizing the upper winding of relay 203BN from (+), through a circuit including back contact 248 of relay 203R, upper winding of relay 203BN, and front contact 249 of relay 217RR, to (—).

The picking up of relay 203BN closes a circuit for energizing relay 200R, providing a route is being set up from 210 to 217, from (+), through a circuit including front contact 220 of relay 210RR, back contact 250 of relay 200AN, upper winding of relay 200R, back contact 251 of relay 200BN, back contact 252 of relay 201AN, back contact 253 of relay 201BN, back contact 254 of relay 202AN, back contact 255 of relay 202BN, wire 294, and front contact 256 of relay 203BN, to (—).

After relay 200R picks up, for a route from 210 to 217, that relay and relay 203BN act in a similar capacity to the RR relays for the ends of that route, for causing the picking up of relay 201R for the next consecutive track switch from the entrance end of the route.

Under these conditions relay 201R is energized from (+), through a circuit including front contact 257 of relay 200R, back contact 258 of relay 201AN, upper winding of relay 201R, back contact 253 of relay 201BN, back contact 254 of relay 202AN, back contact 255 of relay 202BN, wire 294, and front contact 256 of relay 203BN, to (—).

After relay 201R picks up, that relay acts also in a similar capacity to the RR relays for the ends of that route in closing a circuit for the control of relay 202R, from (+), through a circuit including front contact 259 of relay 201R, back contact 260 of relay 202AN, upper winding of relay 202R, back contact 255 of relay 202BN, wire 294, and front contact 256 of relay 203BN, to (—).

After all of the relays required for setting up a route from 210 to 217 have been picked up through the circuits described, a stick circuit is closed for holding the relay 217RR in its picked up position, after the exit button associated therewith has been restored to a normal position, from (+), through a circuit including a front contact on relay 210NR (not shown), wire 282, front contact 226 of relay 210RR, front contact 261 of relay 200R, front contact 262 of relay 201R, front contact 263 of relay 202R, wire 287, front contact 264 of relay 203BN, front contact 265 of relay 217RR, and winding of relay 217RR, to (—).

To further illustrate how the system employed may be used to cause the positioning of a series of track switches including training point and facing pont track switches, in which one or more facing point switches is required to be normal and one or more facing point switches is required to be reverse, assume the operator to set up a route from signal 210 to signal 216, which route requires the positioning of a trailing point switch, the positioning of two facing point switches to a normal position and the positioning of two other facing point switches to a reverse position.

In setting up a route from signal 210 to signal 216 the relay 204BN is the first to be energized after the relays 210RR and 216RR for the ends of the route have been picked up, due to the operation of the control buttons, and relay 204BN is energized, as soon as relay 216RR picks up, from (+), through a circuit including front contact 266 of relay 216RR, upper winding of relay 204BN and back contact 267 of relay 204R, to (—).

The picking up of relay 204BN causes that relay to define the exit point of the route with reference to the picking up of relays for other track switches included in that route, and in doing so it closes a circuit for energizing relay 202AN from (+), through a circuit including front contact 220 of relay 210RR, back contact 268 of relay 200AN, back contact 234 of relay 200BN, back contact 269 of relay 201AN, back contact 270 of relay 201BN, back contact 271 of relay 202R, upper winding of relay 202AN, wire 293, back contact 272 of relay 203R, and front contact 273 of relay 204BN, to (—).

The picking up of relay 202AN causes that relay to act as a route relay in closing a circuit for the energization of relay 200R, from (+), through a circuit including front contact 220 of relay 210RR, back contact 250 of relay 200AN, upper winding of relay 200R, back contact 251 of relay 200BN, back contact 252 of relay 201AN, back contact 253 of relay 201BN, and front contact 254 of relay 202AN, to (—).

After relay 200R picks up, that relay also acts in a similar manner as a route end relay in closing a circuit for the control of relay 201R, from (+), through a circuit including front contact 257 of relay 200R, back contact 258 of relay 201AN, upper winding of relay 201R, back contact 253 of relay 201BN, and front contact 254 of relay 202AN, to (—).

After relay 201R picks up, a circuit is closed for picking up relay 203AN from (+), through a circuit including front contact 259 of relay 201R, back contact 278 of relay 201BN, back contact 279 of relay 202R, wire 292, upper winding of relay 203AN, back contact 280 of relay 203R and front contact 281 of relay 204BN, to (—).

After all of the relays for the positioning of the track switches included in the route from 210 to 216 have been picked up, a stick circuit is closed for relay 216RR so as to hold that relay in its picked up position, after the restoration of the exit button with which it is associated to a normal position, from (+), through a circuit including a front contact of relay 210NR, (not shown), front contact 226 of relay 216RR, front contact 261 of relay 200R, front contact 262 of relay 201R, front contact 274 of relay 202AN, wire 286, front contact 275 of relay 203AN, front contact 276 of relay 204BN, front contact 277 of relay 216RR, and winding of relay 216RR, to (—).

It will be noted that two particular selecting circuits have been used in the control of the relays used in the self-selecting network for the particular track layout shown in Figs. 4A and 4B, of which the circuits shown on the outside of the AN, BN and R relays are used in the control of the AN relays, such as was shown in the control of relay 202AN for setting up a route from 210 to 216, and the other type of circuit selections shown on the inside of the AN, BN and R relays are used in selecting the control of the R relays for setting up a route, such as was shown, for example, in the control of relay 200R for setting up a route from 210 to 217.

Figs. 5A and 5B are identical to Figs. 1A and 1B except the relay 3N is shown as a repeater of the relay 2AN instead of being controlled in multiple with such relay; the relay 4N is shown as a repeater of the relay 5BN instead of being controlled in multiple therewith; and relays 6N and 6R have been added for a track switch 6ts to illustrate how the relay 6N for this switch acts as a repeater of both the normal and reverse relays 2BN and 2R. The circuits in each of these cases are obvious simple circuits and it is deemed unnecessary to describe them in detail.

Summary

A system of electric interlocking for the control of power operated track switches and signals of a railroad has been disclosed in which manipulations designating the entrance and exit points of different routes causes the system to automatically set up such routes through the medium of a self-selecting network having at least three characteristic features or principles of organization. These principles of organization are characteristic of the present invention in such a way that the adaptation of the present invention to any particular track layout involves the use of one or more of these principles of organization.

In applying the system of the present invention to a track layout, track switches which are invariably trailed in particular positions by a train moving from a particular point constituting either an entrance or an exit point, are operated to such positions from their last operated positions as soon as a control button for such particular point is operated irrespective of the operation of the control button for the opposite end of the route to be set up. For example, the actuation of the entrance button 12NB or the exit button 12XB causes the energization of the route end relay 12RR irrespective of whether such signal location 12 is to be an entrance or an exit point. The designation of such signal location as being a point included in a route causes the energization of the relay 2BN to operate the track switch 2TSB to a normal position irrespective of the particular route end relay which is energized at the opposite end of the route to be set up.

A second feature which is used in applying the present invention to a track layout applies to each switch which is invariably operated to a particular position when an adjacent switch is operated to a particular position, and such a switch is controlled in multiple with such adjacent switch or as a repeater of such switch. For example, whenever a route is to be set up over the track switch 2TSA in a normal position, it is obvious that the track switch 3TS must also be in a normal position. With reference to Figs. 1A and 1B, it will be seen that the relays 2AN and 3N are controlled in multiple. It is to be understood that one of these relays could be a repeater of the other just as well as being controlled in multiple. Relay 3N of Fig. 5A illustrates this equivalent circuit connection. This principle may be modified in certain cases so as to cause a switch to be operated to a particular position whenever an adjacent switch is operated to either position. The control for relay 6N of Fig. 5A illustrates this equivalent circuit connection. This would apply to a succession of switches which are trailed in the same direction with a train moving toward a common point.

Other switches in a track layout, which by reason of their location in the track layout cannot have their positions determined by the defining of an entrance or exit point, or by the operation of an adjacent switch, are controlled dependent upon route conditions, that is, conditions which require the defining of the opposite ends of the routes in which they are included. Such route conditions may be provided either from contacts on the route end relays or by contacts on the N or R relays for the intervening track switches. For example, the crossover 5TS requires the operation of both an entrance button for the signal 11 and an exit button for the signal 14 in order to cause its reverse operation by picking up the relay 5R. Other examples of a more complex nature will be found in Figs. 4A and 4B.

Such a network provides that each normal and reverse relay N and R is supplied with full potential from a source of energy and all relays are energized in multiple from such source.

The self-selecting network also provides that optional routes are automatically selected in accordance with traffic conditions and upon a time basis in the absence of traffic selecting conditions. In other words, a preferred route is immediately selected if there are no conflicts with such preferred route because the inferior route or routes are delayed in their establishment for a predetermined time.

It is to be understood that the self-selecting network herein described may be employed in connection with other types of entrance and exit buttons as well as differently controlled entrance and exit relays instead of employing the entrance relays NR and the route end relays RR. It is also to be understood that various types of circuits may be employed for maintaining the route end relays RR energized if the route locking of the present invention is not employed.

If it is desired that route locking as provided by the present invention shall have substituted therefor rear release route locking, then the features of route locking and the sticking up of the N and R relays may be accomplished in the manner set forth in the application of A. Langdon, Ser. No. 176,466, filed November 26, 1937.

However, the present invention provides route locking in such a way that a given route once set up is locked on the network so long as its governing signal is cleared and a predetermined time after such signal is put to stop if a train is approaching such signal with the time element eliminated if the signal is put to stop with the given route occupied. This arrangement provides that the interlock on the network is maintained for a given route to prevent the preconditioning of conflicting routes and to also provide N and R relays for controlling indicators on a track diagram to indicate the particular route set up, although such indication features have not been specifically disclosed in the present application.

The route locking of the present invention is organized so as to provide that a route once set up is maintained locked on the self-selecting network so long as such route remains occupied by a train.

Another feature of the self-selecting network of the present invention resides in the fact that a route is automatically set up independently of the direction of traffic for such route.

Having described the invention as applied to the setting up of routes over two different track layouts as two specific embodiments of the present invention, it is desired to be understood that this form is selected to facilitate in the disclosure of the present invention rather than to limit the number of forms which it may assume; and it is to be further understood that various modifications, adaptations and alterations may be applied to the specific forms shown to meet the requirements of practice, without in any manner departing from the spirit or scope of the present invention except as limited by the appending claims.

What we claim is:

1. In a switch and signal control system for railroads; a track layout including track switches for providing a plurality of routes between signal locations constituting entrance and exit points; a control panel having a miniature track diagram of said track layout with the switches and signals represented thereon; manually operable buttons on said miniature track diagram at points corresponding to said signal locations constituting the entrance and exit ends of the routes between such signal locations; normally deenergized normal and reverse switch control relays for each of said track switches for governing its power operation to set up the different routes; energizing circuit means associated with each track switch which has the same position for all of the routes terminating at an adjacent route end, said means being responsive to the operation of a button for that route end for energizing the normal or reverse switch control relay corresponding to said same position irrespective of whether such route end be the entrance or exit end of a desired route; energizing circuit means for each of the remaining normal and reverse switch control relays controlled jointly by the operation of a button, or an energized adjacent switch control relay, for the entrance end of a desired route and by the operation of a button, or an energized adjacent switch control relay, for the exit end of a desired route for energizing such normal and reverse switch control relays as are required to set up the desired route; circuit controlling means associated with each track switch and operated to positions in accordance with the position of its track switch; and circuit means controlled in response to the joint actuation of the manually operable buttons at the opposite ends of a desired route and governed by said circuit controlling means associated with the switches included in that route so as to effect the clearing of the signal at the entrance end of the desired route when it has been set up.

2. In a switch and signal control system for railroads; a track layout including several track switches to set up routes between signal locations some of which are conflicting routes; a control panel having thereon a track diagram representing the various track switches and signals of said track layout; manually operable buttons disposed on said track diagram adjacent the signal locations constituting the entrance and exit points of the various routes provided by the track switches of the track layout, said buttons at the exit points being self-restored to normal after each manual actuation; normally deenergized normal and reverse switch control relays for each of the track switches; an energizing circuit associated with the switch control relays of each of such switches nearest any signal location that always assumes the same position for train movement from such signal location, said energizing circuit being rendered effective by manual actuation of a button at that signal location to energize the particular switch control relay required to operate said switch to said same position; energizing circuits for the switch control relays of the remaining switches in a given route, said energizing circuits being closed by energization of switch control relays for adjacent switches to cause such switches to assume the normal or reverse position as may be required to complete said given route; a route end relay associated with each exit point; circuit means for each route end relay initially energized by the actuation of the associated button for the corresponding exit point; and a stick circuit means for a given route end relay governed by the normal or reverse switch control relay of each of the switches in a route leading from the corresponding exit end to the entrance end of the particular route established by the switch control relays then energized, said stick circuit means also being controlled by the button for the entrance end of that particular route.

3. In an interlocking system for railroads, a track layout including a plurality of track switches to set up routes between signal locations, a control panel having thereon a track diagram representing the various track switches and signals of said track layout, manually operable buttons disposed on said track diagram adjacent the signal locations constituting the entrance and exit ends of the various routes provided by the track switches of the track layout, normally deenergized normal and reverse switch control relays for each of the track switches in the track layout, means responsive to the actuation of a control button for the common end of a plurality of routes for energizing the normal or reverse switch control relay for the switch or switches in that portion of track which is common to all of said routes and thereby operate such switch or switches from their existing normal or reverse positions to the positions required, means for controlling the operation of the remaining switch or switches of a given route from their existing normal or reverse positions to the positions required by energizing the normal or reverse switch control relay for such switch or switches in response to the joint actuation of the control buttons alone for the opposite ends of that route.

4. In a switch and signal control system for railroads, a track layout including several track switches to set up routes between signal locations, a control panel having thereon a track diagram representing the various track switches and signals of the track layout, manually operable buttons disposed on said track diagram adjacent the signal locations constituting the entrance and exit ends of the various routes provided by the track switches of the track layout, normally deenergized normal and reverse switch control relays for each of the track switches of said track layout for controlling the operation of each track switch, means responsive to the individual actuation of a control button at the common end of a plurality of routes by energizing the normal or reverse switch control relay of the switch or switches in that portion of track which is common to all said routes to operate such switch or switches from their existing normal or reverse positions to the position required, means responsive to the joint actuation of the manually operable buttons alone at the opposite ends of any given route for energizing the normal or reverse control relays as required for the switches in that route which do not have their positions determined by the individual actuation of the manually operable button at the common end of said given routes, means governed by the manually operable buttons at the opposite ends of a given route and effective, only if all of the switches in that route have operated to the required positions, to clear a signal at the entrance end of said given route.

5. In an interlocking system for railroads; a track layout including a plurality of routes having different exit ends but a common entrance end with a portion of track in common to the several routes, said portion of track including at least one track switch; normally deenergized normal and reverse control relays for each of said track switches, each of said track switches being power operated to the normal or reverse position in accordance with the energization of its respective normal or reverse control relay; an entrance button for said entrance end and an exit button for each of said different exit ends; means responsive to the actuation of said entrance button for energizing the normal or reverse relay for said switch in said common portion of track to operate that switch to the position required to set up such common portion of track; and means responsive to the energization of a normal or reverse relay for said switch in the common portion of track and the actuation of a given exit button for energizing the normal or reverse relay of the other switch or switches in a particular route connecting said entrance end with said given exit end to operate such other switch or switches to positions required to set up said particular route; whereby a route is set up from said entrance end to any given exit end in response to the joint actuation of the entrance and exit buttons alone for the opposite ends of such route.

6. In an interlocking system for railroads; a track layout including a plurality of track switches to set up a plurality of routes between signal locations; a control panel having thereon a track diagram representing the various track switches and signals of said track layout; manually operable entrance and exit buttons located on said track diagram adjacent each of the signal locations constituting the entrance and exit ends of the various routes; normally deenergized normal and reverse switch control relays for each of the track switches of said track layout, each of said track switches being power operated to the normal or reverse position in accordance with the energization of its respective normal or reverse control relay; means responsive to the operation of an entrance button for energizing the normal or reverse relay of one switch of a certain route to operate that switch to the position required to set up such route, means responsive to the operation of an exit button for energizing the normal or reverse relay of another switch of said route to operate that switch to the position required to set up such route, and means responsive to the energization of the particular normal or reverse relays of said one and said another switches for energizing the normal or reverse relay of a third switch to operate that switch to the position required to set up said route.

7. In a switch and signal control system for railroads; a track layout including a plurality of routes between signal locations constituting the entrance and exit ends of such routes; manually operable control buttons associated with each of said signal locations constituting the ends of the various routes; a route end relay for each signal location; circuit means for energizing any route end relay in response to the manual actuation of a control button for the corresponding end of that route; normally deenergized normal and reverse switch control relays for each of the track switches in said track layout, each of said track switches being power operated to the normal or reverse position in accordance with the energization of its respective normal or reverse switch control relay; circuit means responsive to the energization of the route end relay for a given signal location of certain ones of said signal locations for energizing the normal or reverse switch control relay for each one or more track switches as required to operate said one switch to a position which it must assume when that given signal location is to be included in any given route, said circuit means being effective irrespective of the energized or deenergized condition of the route end relay for the opposite end of any route; and circuit means controlled jointly by both the route end relays for the opposite ends of a given route for energizing the normal or reverse switch control relay of the remaining switch or switches in that route to operate such switches to positions as required to set up that route.

8. In a switch and signal control system for railroads; a track layout including a plurality of track switches to provide a plurality of routes between signal locations constituting the entrance and exit ends of such routes; manually operable control buttons associated with each of said signal locations constituting the ends of the various routes; a route end relay for each signal location; circuit means for energizing any route end relay in response to the manual actuation of a control button for the corresponding end of that route; normally deenergized normal and reverse switch control relays for each of the track switches in said track layout, each of said track switches being power operated to the normal or reverse position in accordance with the energization of its respective normal or reverse control relay; circuit means responsive to the energization of any route end relay alone for selectively energizing the normal or reverse relays for such of the track switches which must always assume particular positions when any route is to be set up terminating at the signal location corresponding to that route end relay; and circuit means requiring the energization of both the route end relays for the opposite ends of a given route for selectively energizing the normal or reverse switch control relays of the switches in that route which may assume different positions for other routes terminating at the same signal locations.

9. In an interlocking system for railroads, a track layout including a plurality of single track switches and crossovers to provide a plurality of routes, a control panel having control buttons for the entrance and exit ends of the routes, a route end relay for each entrance or exit point, circuit means for energizing each route end relay when the entrance or exit button for the corresponding end of the route is operated, a normal and a reverse control relay for the normal and reverse positions of each single track switch and two normal control relays for the normal positions of the track switches for each crossover and a reverse control relay for the reverse position of each crossover, means for positioning said track switches in correspondence with the picked up position of the normal or reverse control relays for that track switch, circuit means for energizing all of the control relays for positioning all of the track switches between the entrance and exit ends of each route when the route end relays for both ends of that route are picked up, and circuit means for maintaining the route end relay for the exit end of that route in a picked up position after the exit button for that end of the route is restored to normal, only provided each of the control relays for the position of the track switches included in that route is picked up.

10. In a switch and signal control system for railroads; a track layout including a plurality of switches to set up a plurality of routes between signal locations constituting the entrance and exit ends of such routes; manually operable control buttons associated with each of said signal locations constituting the ends of said routes through the track layout; a route end relay for each signal location; circuit means for energizing the route end relays for the opposite ends of a particular route in response to the manual actuation of the control buttons for such opposite ends of that route; normally deenergized normal and reverse switch control relays for each of the track switches in said track layout, each of said track switches being power operated to the normal or reverse position in accordance with the energization of its respective normal or reverse control relay; route establishing means responsive to the energized condition of the route end relays for the opposite ends of a given route for selectively energizing the normal and reverse relays for the track switches in such route to cause their operation to positions proper to set up that route; an organization of stick circuits each individually appertaining to a particular one of said routes; means for applying energy to the stick circuit of a given route for maintaining energized the route end relay at the exit end of such route dependent upon the energized condition of the route end relay at the entrance end of that route; and means for applying energy to the stick circuit of a given route when that route is occupied by a train for maintaining energized the route end relays at the opposite ends of such route.

11. In a switch and signal control system for railroads; a track layout having track switches arranged to set up a plurality of routes between the signal locations constituting the entrance and exit ends of such routes; manually operable control buttons associated with each of said signal locations; a route end relay for each signal location; circuit means controlled by said manually operable control buttons for energizing the route end relays at the opposite ends of a given route in response to only the manual actuation of the control buttons for the opposite ends of such route; normally deenergized normal and reverse switch control relays for each of the track switches in said track layout, each of said track switches being power operated to the normal or reverse position in accordance with the energized condition of its respective normal or reverse switch control relay; a route establishing circuit network rendered effective in response to the energized condition of the route end relays at the opposite end of each route for energizing the normal or reverse relays for the track switches in a route to cause their operation to positions required to set up such route; an organization of holding circuits arranged in a manner characteristic of said track layout, each of said circuits individually appertaining to a particular one of the routes through the track layout; circuit means for applying energy to the holding circuit of a given route in a manner to render that circuit a stick circuit for maintaining the route end relay at the exit end of such route dependent upon the energized condition of the route end relay at the entrance end of that route whereby the restoration to normal of the manually operable control button at the exit end of a route does not cause the deenergization of the route end relay at the exit end of such route; circuit means for applying energy to a signal at the entrance to a route when such route is set up and the route end relays for that route are energized; and means for applying energy to the holding circuit of a given route when a signal for that route is clear and for a predetermined time after such signal is returned to stop if a train is approaching such signal, said holding circuit for such given route under such conditions being rendered a stick circuit for the route end relays at both ends of such route.

12. In a switch and signal control system for railroads; a track layout including a plurality of track switches for setting up a plurality of routes between signals located at the ends of such routes; a control panel having thereon a track diagram representative of the switches and signals of the track layout; manually operable entrance and exit buttons located on said track diagram adjacent the signal locations constituting the entrance and exit ends of the various routes; normally deenergized normal and reverse switch control relays for each of the track switches of said track layout, each of said track switches being power operated to the normal or reverse position in accordance with the energization of its respective normal or reverse control relay; route establishing means responsive to the actuation of an entrance button for the entrance end of a given route and the actuation of an exit button for the exit end of that route to effect the energization of the normal and reverse switch control relays for the switches in that route so as to operate them to positions required to set up that route, said means also being effective after the route has been set up to clear a signal at the end corresponding to the operated entrance button; and means for maintaining energized the normal and reverse relays for the track switches in a given route when a signal governing traffic over that route indicates clear and for a predetermined time after such route is returned to stop if a train is approaching said signal, said means also being effective so long as a train is in such given route.

13. In an interlocking system for railroads, a track layout having a plurality of tracks connected by a plurality of single track switches and crossovers, entrance and exit control buttons for the entrance and exit ends of the routes, a route end relay for each entrance or exit point, circuit means for energizing each of said route end relays when the corresponding entrance or exit button for a given end of the route is operated, a normal control relay for each single track switch and two normal control relays for the track switches for each crossover, a reverse control relay for each single track switch and for each crossover, means for positioning each of said track switches in correspondence with the picked up position of its control relays, route establishing circuit means responsive to the energization of the route end relays for the opposite ends of a given route for selectively energizing the normal and reverse control relays of the track switches in that route so as to set up such route, and circuit means for maintaining energized the route end relays for the opposite ends of a given route so long as such route is occupied by a train.

14. In an interlocking system for railroads; a track layout having a plurality of tracks connected by a plurality of track switches; a plurality of track sections included between the entrance and exit ends of the routes, each of said sections having a track relay; control buttons for the entrance and exit points; a route end relay for each entrance or exit point; circuit means for energizing a given route end relay when a control button for that end of the route is operated; one normal control relay for each single track switch and two normal control relays for each crossover; one reverse control relay for each single track switch and one reverse control relay for each crossover; means responsive to the picking up of said normal and reverse control relays for causing their respective track switches to be operated to corresponding normal or reverse positions; route establishing circuit means responsive to the energization of the route end relays for the opposite ends of a given route for selectively energizing the normal and reverse control relays of the track switches in that route so as to set up such route; and circuit means for maintaining energized the route end relays for both ends of a given route when the track relay for any track section included in that route is dropped away.

15. In a system for governing traffic on railroads; a track layout including a plurality of track switches to set up a plurality of routes between signal locations, said track layout including a plurality of switches successively adjacent one of said signal locations which switches must be in particular positions for any one of the routes terminating at that signal location; a control panel having a track diagram representing said track layout; manually operable buttons disposed on said track diagram at locations corresponding to the signal locations of the actual track layout; normal and reverse switch control relays for each of the track switches of the track layout; an energizing circuit for each switch control relay for each switch including a back contact of the other switch control relay of that switch; circuit means responsive to the manual operation of a button for said one signal location alone for energizing the control circuit of the switch control relay for the switch adjacent such signal location to cause that switch to assume said particular position required for all routes terminating at that signal location, and circuit means controlled by the response of the switch control relay for said adjacent switch for energizing the switch control relay for the next adjacent switch to cause it to assume said particular position required for all routes terminating at said one signal location.

16. In an interlocking system for railroads, a track layout including a plurality of track switches to set up a plurality of routes between signal locations, said track layout including at least one switch adjacent a certain of said signal locations which must be in a particular position for any one of the routes terminating at the corresponding signal location; a control panel having thereon a track diagram representing the various track switches and signals of said track layout; manually operable buttons disposed on said track diagram adjacent the signal locations represented thereon; normal and reverse switch control relays for each of the track switches of the track layout; control circuits for the switch control relays for each of said switches so arranged as to provide a back contact of the normal switch control relay for any given switch in the control circuit for the reverse switch control relay of that switch, and to provide a back contact of the reverse switch control relay for any given switch in the control circuit for the normal switch control relay for that switch; circuit means responsive to the manual actuation of a control button for said certain signal location to cause the energization of the control circuit of the proper switch control relay of the switch adjacent that signal location to cause such switch to assume said particular position for all routes terminating at that location; circuit means rendered active in response to the operation of the control buttons at the opposite ends of any route including said certain signal location for one end and controlled by the switch control relays of the switch adjacent such one end for energizing the control circuits for the proper switch control relays of the remaining switch or switches in the route to operate the switches from their existing normal or reverse positions to the positions required to set up that route; and means controlled by the joint operation of the control buttons at the opposite ends of any given route and the response of the proper normal or reverse switch control relays for the switches in that route to cause the clearing of the signal at the entrance end of such route.

17. In a switch and signal control system for railroads; a track layout providing a plurality of routes between signal locations, said track layout having a switch adjacent certain signal locations which must be in the same position for all routes terminating at that signal location, said track layout also including at least one other switch; manually operable control buttons for each of the signal locations; means responsive to the operation of the control button for any one of said certain signal locations alone for governing the switch control relays of said adjacent switch; and means for governing the switch control relays for said other switch controlled by said switch control relays for said adjacent switch and by the manual operable control button for the opposite end of a route including one of said certain signal locations.

18. In a switch and signal control system for railroads; a track layout having track switches for providing a plurality of routes between signal locations; a miniature track diagram of said track layout representing said track switches and signals; manually operable control buttons on the track diagram for the signal locations; a route end relay for each signal location; circuit means controlled by said manually operable control buttons for each signal location for energizing the route end relay for the corresponding signal location; normal and reverse switch control relays for each of the track switches in said track layout for controlling the power operation of the corresponding track switches; route establishing means rendered effective in response to the energized condition of the route end relays at the opposite end of any given route for energizing the proper normal or reverse switch control relays to effect the setting up of the corresponding route; signal clearing means controlled by said manually operable control buttons and said normal and reverse switch control relays for clearing a signal at the entrance to an established route; an organization of holding circuits arranged in a manner characteristic of said track layout and including front contacts of said normal and reverse switch control relays so as to provide a holding circuit individually appertaining to each route and electrically isolated from the other circuits when the proper normal or reverse switch control relays for that route are energized; means for applying energy to the holding circuit for any particular route when a train is present in such route; and means for applying energy to the holding circuit of any given route having a cleared signal at the entrance thereto and for a predetermined time after such signal is returned to stop providing a train is in approach to such signal.

19. In a switch and signal control system of the entrance-exit type; a track layout including track switches which provide a plurality of conflicting routes extending between entrance and exit points; manually operable contact means for, when actuated, designating the respective entrance and exit points for each route to be established; normal and reverse switch control relays for each track switch for governing the operation of such track switch to respective normal and reverse positions, such relays being normally deenergized and electrically interlocked to prevent the picking up contemporaneously of normal and reverse relays for conflicting positions of any one track switch; circuit means for energizing a normal or a reverse switch control relay, dependent upon the position of the track switch required, for each track switch that would be trailed upon passage of a train from each entrance point designated, only if such track switch is included in every route emanating from such entrance point; circuit means effective upon designation of an exit point for a route subsequent to the designation of an entrance point for that route for energizing a normal or a reverse switch control relay, dependent upon the position of the track switch required, for each of the track switches in the route between the designated entrance and exit points which has not had its switch control relays positioned upon designation of the entrance end of that route; and switch operating means for positioning each track switch in accordance with the normal or reverse switch control relay energized for that track switch.

20. In a switch and signal control system for railroads of the entrance-exit type for the establishment of any desired route by the power operation of track switches in a track layout providing a plurality of conflicting routes extending between entrance and exit points by the designation of the entrance and exit ends only of such route; manually operable contact means for the entrance and exit ends of each of the routes; normally deenergized normal and reverse switch control relays for each of the track switches in the track layout; circuit means responsive to the actuation of said contact means for the entrance end of a route for energizing the normal or reverse switch control relay, dependent upon the position of the track switch required, for each track switch required to be in a particular position, if such switch is included in all routes emanating from such entrance point; circuit means upon designation of an exit point for a route, subsequent to the designation of an entrance point for that route, for effecting the energization of each normal or reverse relay, dependent upon the position of the track switch required, for each track switch not already having its switch control relay energized which is included in a route extending between the entrance and exit points designated, and switch operating means for positioning each track switch in accordance with the normal or reverse switch control relay energized.

21. In a switch and signal control system for railroads of the entrance-exit type for the establishment of each route desired by the power operation of track switches in a track layout providing a plurality of conflicting routes between entrance and exit points at the ends of the routes; an entrance button and an exit button for each respective entrance and exit point, each entrance button having an operating position from which it must be manually restored and each exit button having an operating position from which it is self-restored, such restoration being mechanically free to be effected at any time; a route end relay for each route end energized whenever either the entrance button or exit button for that route end is in an operating position; normally deenergized normal and reverse switch control relays for each track switch effective when energized for operating that track switch to a corresponding position; circuit means for energizing said normal and reverse switch control relays upon the energization of the route end relays for the opposite ends of each route in such a selective manner as to operate their respective track switches to positions required for the establishment of a route between the route ends corresponding to the route end relays energized, except when such route is in conflict with a route already established; stick circuit means for maintaining the route end relay for each exit point energized dependent upon the contact means for the entrance end of that route in its operated position; and stick circuit means for maintaining the route end relays for both ends of each route energized as long as any portion of that route is occupied by a train, irrespective of the restoration of the button for the entrance point to that route to its normal position.

22. In a switch and signal control system of the character described, a track layout providing for the establishment of any desired one of a plurality of conflicting routes extending between entrance and exit points at the route ends by the power operation of track switches; manually operable contact means for each entrance and exit point; such contact means having an operating position from which it can at any time be restored to a normal position; a route end relay for each route end energized when said contact means for an entrance or exit point at that route end is in an operating position; normally deenergized normal and reverse switch control relays for each track switch effective when energized for operating that track switch to a corresponding position, such normal and reverse switch control relays being electrically interlocked in such a manner as to prevent the energization contemporaneously of normal and reverse switch control relays for conflicting positions of any one track switch; circuit means for selectively energizing said normal and reverse switch control relays upon the energization of said route end relays for the opposite ends of each route in such a manner as to operate their respective track switches to positions required for the establishment of a route between the route ends corresponding to the route end relays energized, except when such route is in conflict with a route already established; and circuit means for maintaining said normal and reverse switch control relays energized for each track switch included in the portion of a route in advance of each train, irrespective of the restoration of said manually operable contact means to normal.

23. In a switch and signal control system of the character described; a track layout providing a plurality of conflicting routes extending between entrance and exit points at the route ends which are defined by the location of wayside signals; manually operable contact means for each entrance and exit point for designation by an operator of the respective ends of each route to be established; an entrance relay for each entrance point; a route end relay for each route end; circuit means for energizing each of said entrance relays when said contact means for that point is actuated to a particular position and for deenergizing such relay when said contact means is actuated to another position, the picking up of each of said entrance relays being ineffective if there is a route already established terminating at that route end; circuit means for energizing each route end relay when the entrance relay for that route end is energized; circuit means for energizing a pick-up circuit for each route end relay when said contact means is actuated for that route end as an exit point, such energization being required to be only momentarily effective; route establishing means for establishing each route in accordance with the energization of the route end relays for the ends of such route, except when such route conflicts with a route already established; and stick circuit means effective for each route when it is completely established for maintaining each route end relay for such route energized as long as the entrance relay for that route is maintained energized and as long as any portion of that route is occupied by a train; whereby the route establishing means is maintained energized dependent upon the route end relays, and the route end relays are maintained energized dependent upon the entrance relay for that particular route and dependent upon the presence of a train in any portion of that route.

24. In a switch and signal control system of the entrance-exit type for the establishment of any desired route by the power operation of track switches which provide a plurality of conflicting routes extending through a track layout between entrance and exit points at the route ends which are defined by the location of wayside signals; manually operable contact means for each of the route ends for designation of the entrance and exit ends of each route to be established, a route end relay for each route end; circuit means for energizing the route end relay for each route end when said contact means for that end is actuated; normal and reverse switch control relays for each of the track switches selectively energized when said track switch is included in a route extending between route ends having their corresponding route end relays energized to cause the power operation of their respective track switches for the establishment of a route between the route ends designated; circuit means for clearing a signal for governing entrance to each route when that route is completely established; and stick circuit means for maintaining said route end relays energized as long as the signal for the entrance to that route is clear, as long as any portion of that route is occupied by a train, and a predetermined time after the signal governing entrance to that route is restored to stop if a train in approach of that signal has not yet entered that route.

25. In a switch and signal control system of the character described for the establishment of routes by the power operation of track switches in a track layout which provides a plurality of conflicting routes extending between entrance and exit points at the route ends defined by the location of wayside signals, manually operable contact means for each of the entrance and exit points having an operating position from which such contact means can at any time be restored, normally deenergized normal and reverse switch control relays for each of the track switches of the track layout effective when energized for operating their respective track switches to corresponding positions, route establishing means responsive to the actuation of said contact means for an entrance point of a given route and the subsequent actuation of said contact means for the exit point of that route for energizing a normal or a reverse switch control relay, dependent upon the position of the track switch required, for each track switch included in said given route, and circuit means for clearing the signal governing entrance to said given route when all of the track switches for that route are properly positioned, such signal remaining in a clear position only so long as said manually operable contact means for that entrance point is maintained in an operated position, and stick circuit means for maintaining said normal and reverse switch control relays energized for said given route for a predetermined time after the restoration to normal of said contact means for the entrance point to that route and the restoration to stop of said signal governing entrance to that route, if such restoration is effected prior to the entrance to that route by an approaching train.

ROBERT M. PHINNEY.
FOREST B. HITCHCOCK.